April 26, 1966 J. L. QUINN 3,248,520

COMPARATOR APPARATUS

Filed March 5, 1962 10 Sheets-Sheet 1

INVENTOR.
James L. Quinn,
BY
Wolfe, Hubbard, Voit & Osann
Attorneys.

COMPARATOR APPARATUS
Filed March 5, 1962 10 Sheets-Sheet 2
| LEVEL | CHARACTER | | | | | | | | | |
|---|---|---|---|---|---|---|---|---|---|---|
| | 0 | 1 | 2 | 3 | 4 | 5 | 6 | 7 | 8 | 9 |
| L-1 | | o | | o | | o | | | o | |
| L-2 | | | o | o | | | o | | | o |
| L-4 | o | | | | o | o | o | | | |
| L-7 | o | | | | | | | o | o | o |
| L-C | | o | o | | o | | | o | | |
FIG. 2.
| LEVEL | CHARACTER | | | | | | | | | |
|---|---|---|---|---|---|---|---|---|---|---|
| | 0 | 1 | 2 | 3 | 4 | 5 | 6 | 7 | 8 | 9 |
| A | o | | o | o | | | | o | o | o |
| B | | o | | o | | o | o | o | o | |
| C | o | | | | o | | o | o | o | |
| D | o | | | o | o | o | o | | o | o |
| E | o | o | o | o | | | o | o | | |
FIG. 3.
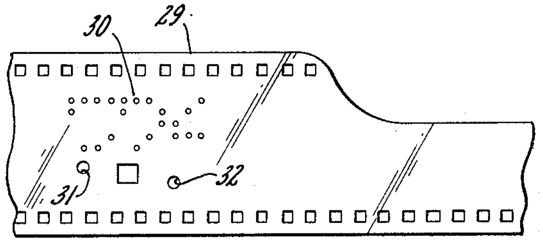
FIG. 5.
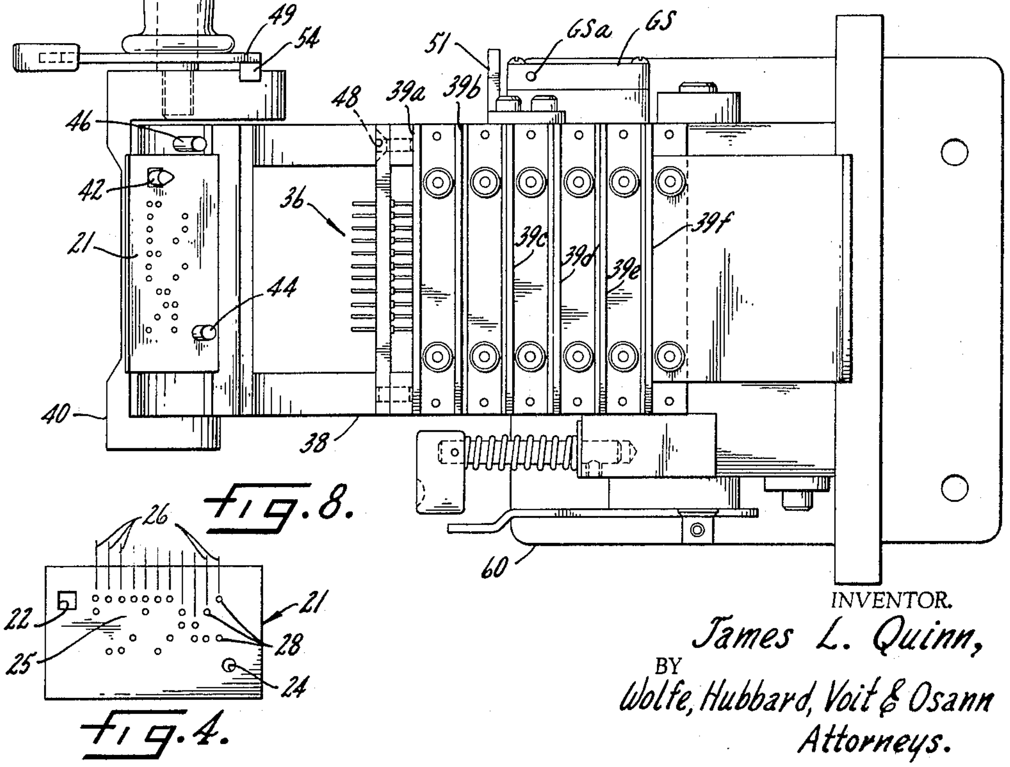
FIG. 8. FIG. 4.
INVENTOR.
James L. Quinn,
BY
Wolfe, Hubbard, Voit & Osann
Attorneys.

COMPARATOR APPARATUS

Filed March 5, 1962

INVENTOR.

James L. Quinn,

BY

Wolfe, Hubbard, Voit & Osann

Attorneys.

April 26, 1966 J. L. QUINN 3,248,520

COMPARATOR APPARATUS

Filed March 5, 1962 10 Sheets-Sheet 4

INVENTOR.

James L. Quinn,

BY

Wolfe, Hubbard, Voit & Osann

Attorneys.

April 26, 1966 J. L. QUINN 3,248,520

COMPARATOR APPARATUS

Filed March 5, 1962 10 Sheets-Sheet 5

INVENTOR.
James L. Quinn,
BY
Wolfe, Hubbard, Voit & Osann
Attorneys.

INVENTOR.

James L. Quinn,

BY

Wolfe, Hubbard, Voit & Osann

Attorneys.

INVENTOR.
James L. Quinn,
BY
Wolfe, Hubbard, Voit & Osann
Attorneys.

INVENTOR.
James L. Quinn,
BY
Wolfe, Hubbard, Voit & Osann
Attorneys.

April 26, 1966 J. L. QUINN 3,248,520

COMPARATOR APPARATUS

Filed March 5, 1962 10 Sheets-Sheet 9

INVENTOR.
James L. Quinn,
BY
Wolfe, Hubbard, Voit & Osann
Attorneys.

INVENTOR.
James L. Quinn,
BY
Wolfe, Hubbard, Voit & Osann
Attorneys.

United States Patent Office 3,248,520

Patented Apr. 26, 1966

3,248,520

COMPARATOR APPARATUS

James L. Quinn, Chicago, Ill., assignor to Cummins-Chicago Corp., Chicago, Ill., a corporation of Illinois Filed Mar. 5, 1962, Ser. No. 177,526
30 Claims. (Cl. 235—61.7)

The present invention relates in general to data processing systems and, more particularly, to apparatus for verifying the validity of information formed on a record medium. In its principal aspect, the invention is concerned with apparatus for sensing patterns of indicia spots representative of particular diverse characters formed on a record medium, and for inhibiting operation of an associated utilization device when the pattern of indicia spots sensed is not representative of any valid character.

In recent years, the use of data processing apparatus, computers or the like in connection with modern business accounting systems has become widespread. It has been found that much time and labor can be saved in such systems by recording bits of information, for example, accounting data, identifying characters, or the like, directly on checks, coupons, tags, tapes or other record media in the form of coded indicia spots. As one example, the record documents may contain such bits of information in the form of indicia spots or holes disposed in different combinations of stations in a five-place, in-line code, with the combination of spots in each line representative of a particular one of a plurality of characters or other bits of information. More often than not, a plurality of different characters or the like are applied to any given record medium in a compact, rectangular array of indicia spots. The indicia spots may take different forms. Merely by way of example, such spots may take the form of closely spaced perforations. Alternatively, the spots may take the form of magnetic material deposited at selected stations on the document. Still another type of indicia spot heretofore employed contemplates the use of spots having different light reflective characteristics than the document upon which they are located.

One principal source of error heretofore encountered in such data processing systems resides in the fact that the spots of indicia may be improperly applied to the document being sensed, thereby representing no valid bit of information. Moreover, some documents having valid bits of information applied thereto become mutilated through either improper usage or wear, thus damaging one or more of the spots of indicia and rendering the information on the document invalid. Considering perforated documents for example, the punches of the perforating apparatus may conceivably become worn or broken so that when the information is applied to the document the perforation edges will be jagged, or perhaps no perforation at all will be formed at one station in the line representing a particular character. Similarly, one or more magnetic or opaque indicia spots may be either misapplied on a document or, when properly applied may later be inadvertently erased, thus rendering the information on the document invalid. However, the utilization device which senses or "reads" the information formed on the document is generally unable to determine when the information sensed is representative of a valid character or when it is representative of no character at all. If, for example, it is assumed that the information represented on a first document is to be reproduced on a second document, the utilization device (e.g., the reproducing perforator) will reproduce the perforation pattern in the second document exactly as that pattern is sensed on the first document. Therefore, any signal information representative of an invalid character will cause the reproducing perforator to apply such an invalid character to the second document, thus continuing the undetected error.

Occasionally, the signal response representative of the presence of invalid coded information may result from faulty sensing equipment rather than from inaccuracies appearing in the document being sensed. For example, if one or more of the sensing elements is defective, it may inaccurately sense the presence or absence of an indicia spot. However, the result is still the same, for the signal information delivered to the utilization device by the sensing elements will still contain one or more bits of invalid information.

It is a general aim of the present invention to provide an improved data processing system for acting upon a record medium and characterized by its ability to produce signal information uniquely corresponding to character-representative indicia located on the medium and for verifying that the signal information produced is representative of a valid character. While not so limited in its application, the invention will find especially advantageous use in vertifying the validity of signal information representative of characters formed on a first document and which are to be applied to one or more second documents, so that the application of invalid coded indicia to such second documents is precluded.

It is a more detailed object of the present invention to provide a data processing system of the type employing an indicia sensing apparatus and a utilization device wherein a plurality of arrays of character-representative indicia formed on a record medium are simultaneously sensed and the signal information derived therefrom is delivered by the sensing apparatus to the utilization device, yet wherein operation of the latter is inhibited if the representation of any one or more characters is invalid.

An important object of the invention is to provide a data processing apparatus in which one complete cycle of sensing information stored on a record medium and transmitting the information sensed to a utilization device is effected by the simple expedient of registering the arrays of character-representative indicia with corresponding arrays of sensing elements, yet in which actuation of the utilization device is inhibited if the information sensed is representative of one or more invalid characters, thus precluding invalid outputs from the utilization device.

In another of its aspects, it is an object of the invention to provide a comparator apparatus for verifying the validity of coded information formed on a record medium, and which is characterized by its versatility and physical compactness. A related object is to provide a comparator control circuit and components therefor which permits of ready installation in a wide variety of data processing apparatus.

A further object of the invention is to provide a comparator apparatus for verifying the validity of character-representative signal information wherein the apparatus is rendered operable as an incident to sensing of valid character-representative indicia formed on a record medium.

It is also an object of the invention to provide an apparatus for checking the validity of information in the form of indicia spots applied to a record medium and in which the verification of such information is based upon the total number of indicia spots present in each information representative array, yet wherein diverse bits of information may be represented by different numbers of indicia spots.

Yet another object of the invention is to provide comparator apparatus for checking the validity of signal information representative of characters formed on a record medium which can be conveniently and economically constructed from conventional circuit components.

More specifically, it is an object of the present invention to provide comparator apparatus for checking the validity of signal responses indicative of character-representative information formed on a record medium wherein the responses to the presence of all indicia spots representative of any given character are converted to an electrical value correlated with the number of such spots and then compared with a known electrical value correlated with the number of such spots in a valid character.

Other objects and advantages of the invention will become apparent as the following description proceeds, taken in conjunction with the accompanying drawings, in which:

FIG. 2 is a chart disclosing a typical in-line code for representing diverse characters;

FIG. 3 is a chart similar to FIG. 2 disclosing the same characters represented in a different in-line code;

FIG. 4 illustrates a typical first document or tag containing indicia spots, here shown as perforations, which are formed in a rectangular field with each of eleven lines representing a particular character according to the code shown in FIG. 2;

FIG. 5 illustrates a typical second document or film strip to which perforations have been applied by the exemplary perforation reproducing apparatus;

FIG. 8 is a fragmentary plan view of the apparatus with its gate shown in the open position;

Figure 1:
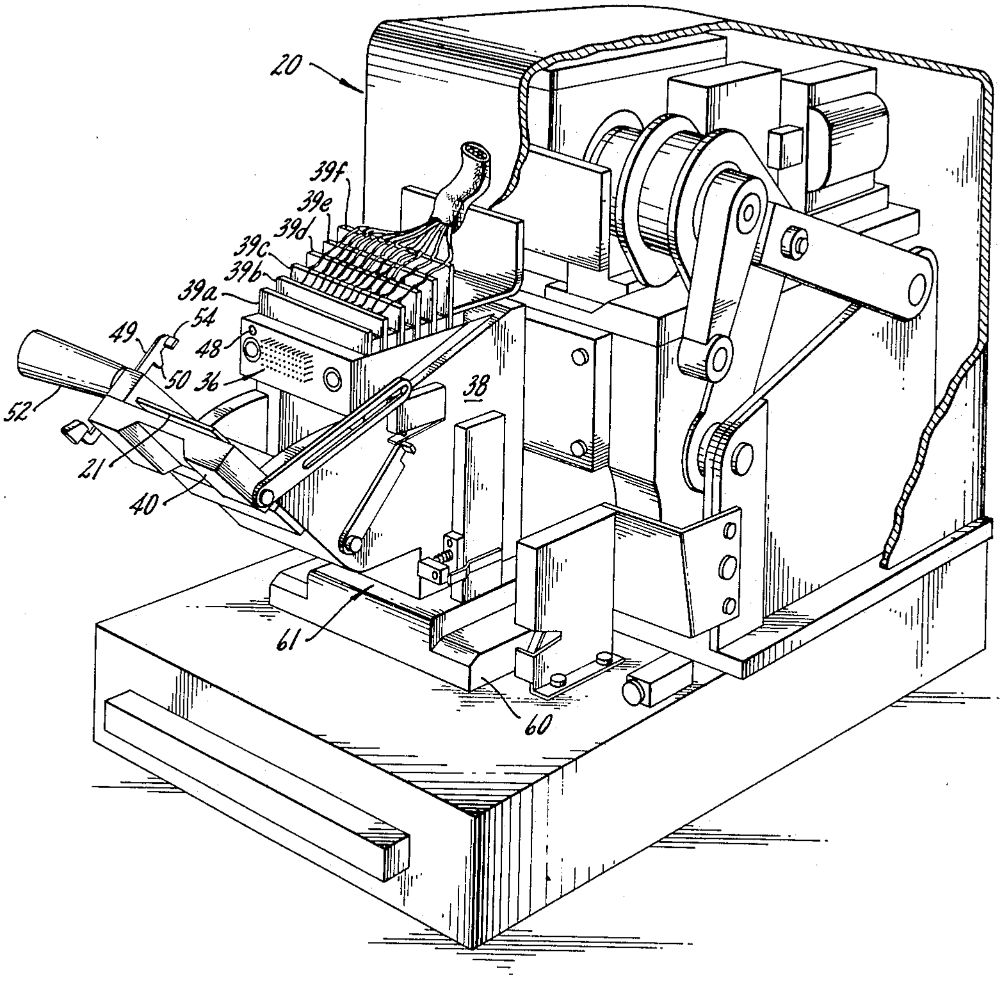
FIGURE 1 is a perspective view of an exemplary data processing apparatus, here shown as a perforation sensing and reproducing apparatus with the exterior casing or cover removed, embodying the features of the present invention.
Figure 14:
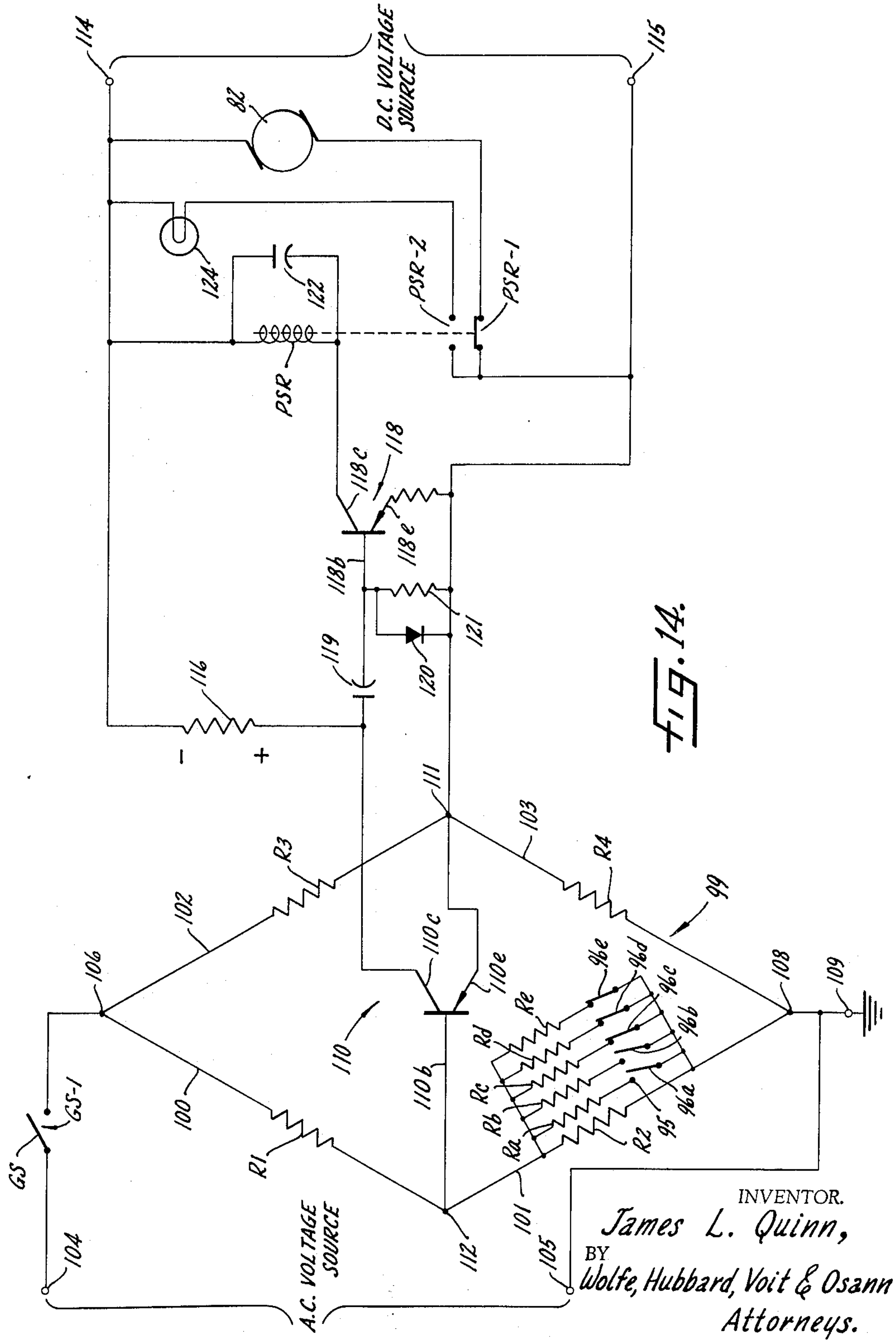
FIG. 14 is a schematic diagram similar to FIG. 13 but illustrating only that portion of the comparator circuit used for verifying the validity of signal information representative of a single character formed on the record medium in accordance with the code shown in FIG. 2.
Figure 15:
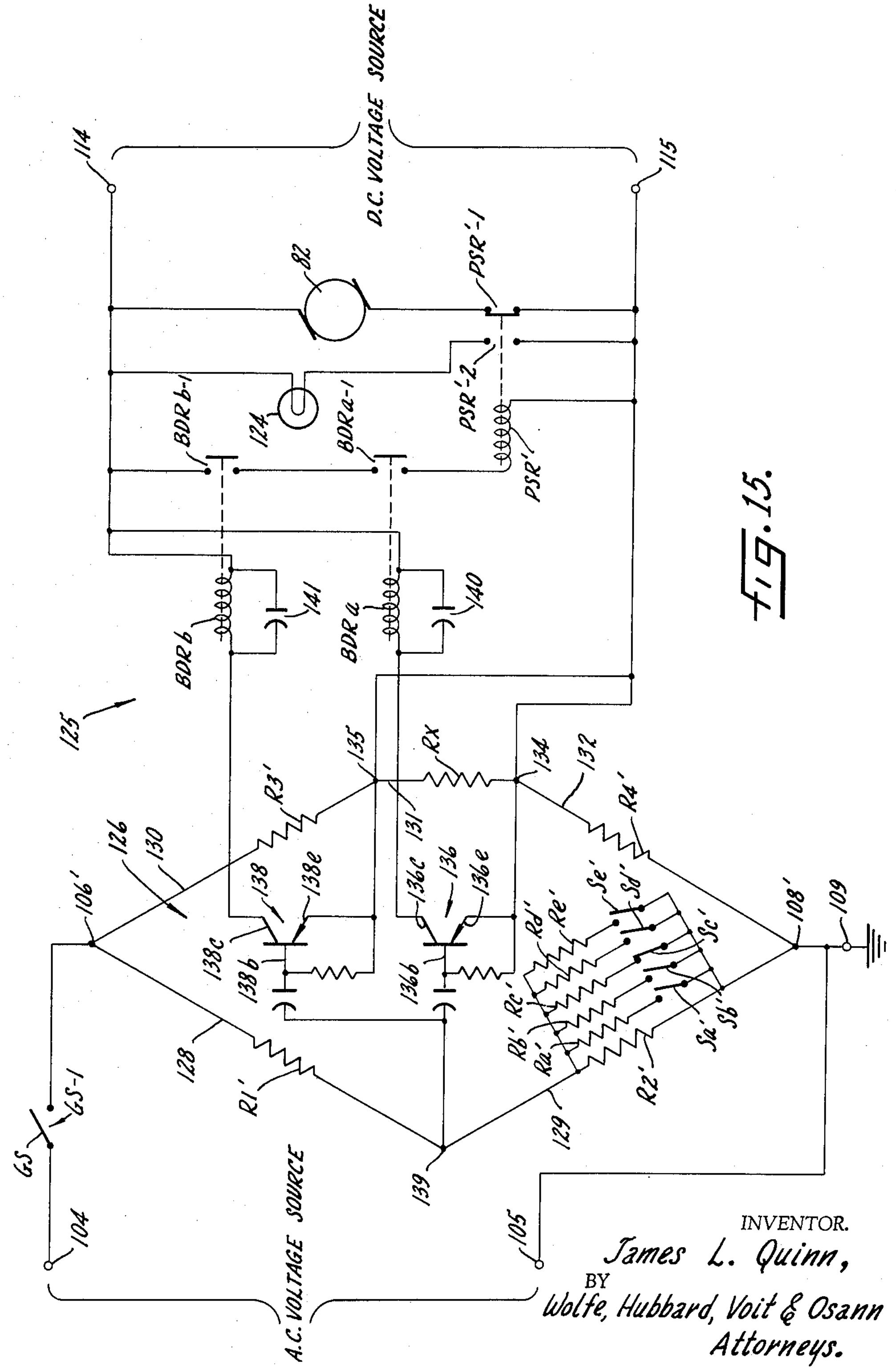
Figure 16:
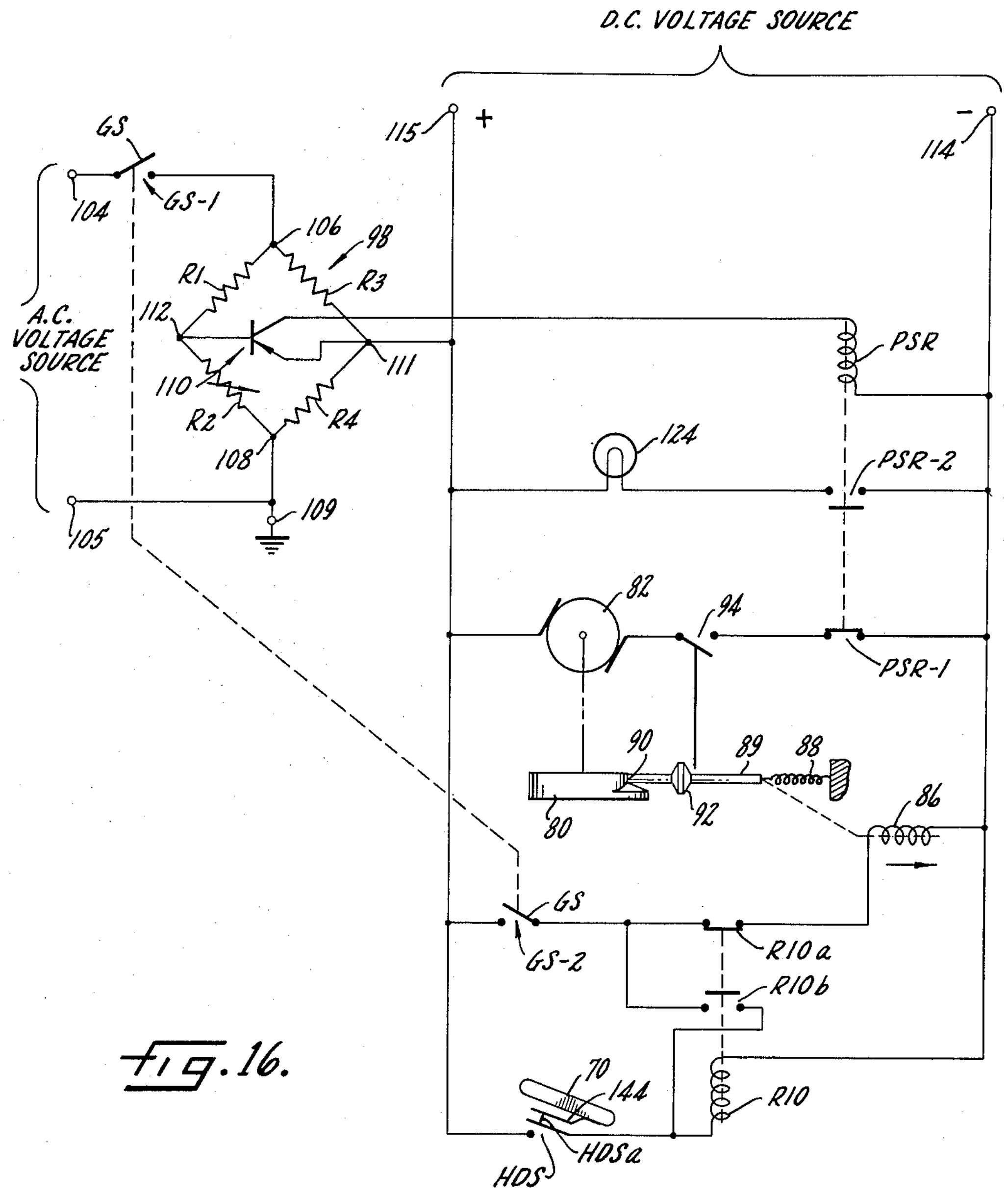

FIG. 15 is a schematic wiring diagram, generally similar to FIG. 14, and illustrating a modified form of comparator circuit for use in verifying signal information representative of a single character formed on a record medium in accordance with the code shown in FIG. 3; and, FIG. 16 is a schematic wiring diagram of some of the controls for the perforation reproducing apparatus shown in FIG. 1, While the invention is susceptible of various modifications and alternative constructions, specific embodiments thereof have been shown by way of example in the drawings and will herein be described in detail. It should be understood, however, that it is not intended to limit the invention to the particular forms disclosed, but, on the contrary, the intention is to cover all modifications, equivalents, and alternative constructions falling within the spirit and scope of the invention as expressed in the appended claims.

Referring more specifically to FIG. 1, an exemplary data processing apparatus, generally indicated at 20 is illustrated. As the description proceeds, it will become apparent that the novel features of the present invention will find use with a wide variety of data processing systems employing appropriate sensing elements for determining the presence or absence of indicia spots formed on a record medium. However, to make clear one environment, the invention is here illustrated and described in connection with a perforation sensing and reproducing apparatus of the type utilizing elongate mechanical feelers or probes for determining the presence or absence of perforations. Such an apparatus is described in detail in the co-pending application of William H. Dreyer and Heinz W. Schreiter, Serial No. 840,111, filed September 15, 1959, now Patent No. 3,049,286 and assigned to the assignee of the present invention. For the purpose of a complete understanding of the present invention and a typical environment within which it will find advantageous application, it will suffice to briefly set forth the basic structural components of the apparatus 20 and the mode of operation thereof. A more detailed understanding of the perforation reproducing apparatus and its associated controls may be readily obtained by reference to the aforementioned Dreyer et al. patent.

The perforation sensing and reproducing apparatus 20 shown in FIG. 1 is intended to successively accept first record media in the form of perforated tags, and to reproduce the perforations formed in each such tag in one or more second record media, for example, in the end of a film strip. Referring to FIG. 4, there is shown a typical tag 21 having a pair of large positioning holes 22, 24 which are formed in the tag with reference spacing from a field 25 of character-representing indicia. Such indicia, preferably representing characters according to a predetermined code, has proved to be of great value in modern business practices since it permits the storage of a great deal of accounting information or the like in a relatively compact array, which information may be conveniently "read" by automatic data processing machines. In the exemplary tag 21, the field 25 is in the form of a plurality of lines 26 of closely spaced indicia spots, here shown as perforations 28, each line by the combination of vertically spaced holes therein representing a particular bit of information, e.g., a numeral or alphabetical character.

The individual characters or other bits of information are uniquely identified by the arbitrary location of perforations 28 at imaginary stations formed on the tag in each line 26 to conform with any selected code system. For example, in the typical in-line, five-place code shown in FIG. 2, the characters "0" through "9" may be represented by two perforations located in different combinations of levels, there being five such levels L1, L2, L4, L7 and LC. Thus, to represent the character "3" for example, it is merely necessary that perforations 28 be located at levels L1 and L2 within a single line 26. It will be apparent upon inspection of FIG. 2 that all of the different valid characters are represented by particular combinations of two and only two perforations. Stated another way, should any line contain one, three, four or five perforations, the perforations would not represent any of the valid characters "0" through "9."

An alternative in-line, five-place code has been illustrated in FIG. 3. As here shown, each of the characters "0" through "9" may be represented by either two or four perforations located in different combinations of levels, there being five such levels A–E. Thus, to represent the character "3" for example, it is merely necessary that perforations be located at levels A, B, D and E within a single line. With this type of a code, should any line contain one, three or five perforations, the information would not be representative of a valid character. Those skilled in the art will readily appreciate that the code shown in FIG. 3 permits a considerably wider degree of selection of coded information to be applied to a record medium than does the code shown in FIG. 2. Moreover, still greater selectivity can be obtained by utilizing other predetermined codes. Merely by way of example, individual characters could be identified by codes having one, three or five perforations located in different combinations within a single line, in which case should any line contain two or four perforations, the information would not be representative of a valid character.

An exemplary second record medium which is to receive a reproduction of the pattern of perforations formed in the tag 21 is here shown as a film strip 29 (FIG. 5) having sprocket holes formed therein. The film strip 29 is perforated by the exemplary reproducing apparatus 20 to form a perforation field 30 containing perforations at stations corresponding to perforations in the tag 21. Simultaneously, a pair of locator holes 31, 32 are perforated in the film strip 29 with reference spacing from the field 30.

For the purpose of reproducing the perforation field 25 present on the tag 21 as a perforation field 30 on the film strip 29, the apparatus 20 includes a sensing mechanism, generally indicated at 34 (FIG. 9), and an interconnected utilization device, here shown as a perforating mechanism generally indicated at 35. The perforating mechanism 35 has herein been termed a utilization device since, as heretofore indicated, the comparator apparatus of the present invention can be used in other applications. Merely by way of example, the sensing mechanism 34 could be interconnected with sorters, data processors, computers, or the like, all of which are utilization devices, and still embody the feautres of the present invention.

The sensing mechanism 34 (FIG. 9) includes a plurality of feelers or probes 36 which are arranged in adjacent lines in a rectangular array (FIG. 1) having spacing corresponding to the spacing of the imaginary array of stations on the tag 21 (FIG. 4). That is, there are eleven vertical lines of probes 36 with each line including five probes **36*a*–36*e* (FIG. 9) corresponding respectively to the five levels of each in-line, five-place code. The probes are elongate or pin-like in configuration and are mounted with freedom for limited endwise movement in a head 38 of the apparatus 20. The forward ends of the probes (i.e., the left ends as viewed in FIG. 9) are all normally alined in a common sensing plane. The probes are staggered in length with the uppermost probe 36*a* in each line having the greatest length and the lowermost probe 36*e* in each line having the shortest length. As here shown, the probes are slidably supported in alined passages bored through guide plates 39*a*–39*e* which are bolted to the head 38. An additional plate 39*f*** is also bolted to the head for a purpose to be subsequently described.

In order to support and orient the tag 21 with its field 25 of perforations accurately alined with the ends of the probes 36, while at the same time providing means for effecting registration of the probes and corresponding perforations in the tag, a gate 40 is carried by the head 38 with freedom for closing (FIGS. 7 and 9) and opening (FIGS. 1, 6 and 8) movement relative to the probe ends. To accomplish this, the gate 40 is mounted on a shaft 41 journalled in the head 38, thus permitting the gate to be pivoted about a horizontal axis. Formed on the innermost face of the gate 40 are a pair of locator studs 42, 44 (FIG. 8) which are positioned to be snugly received within the positioning holes 22, 24 respectively in the tag 21 when the latter is supported on the gate. The studs are positioned on the gate with reference spacing from a rectangular array of openings 45 bored in the gate 40, which array of openings corresponds to both the array of stations on the tag 21 and to the array of sensing probes 36. The arrangement of the studs 42, 44 and the positioning holes 22, 24 is such that when the gate is pivoted to a closed position, the perforation stations in the field 25 of the tag 21 will be precisely alined with the corresponding probe ends. An additional stud 46 may be positioned on the gate 40 for reception in a bore 48 formed in the head 38 so as to facilitate accurate alinement of the probes 36 and the bores 45 formed in the gate 40.

Figure 9:
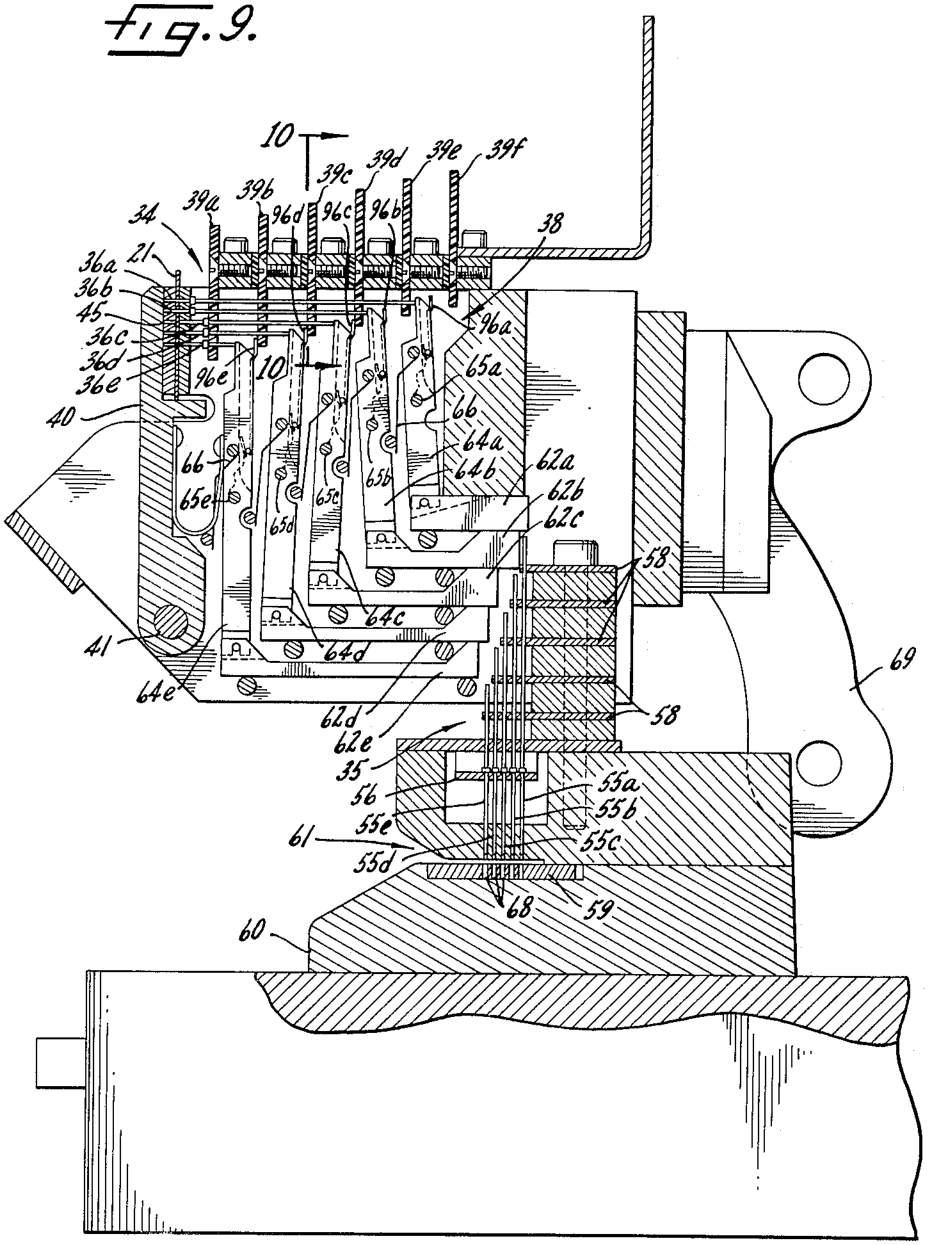
FIG. 9 is a vertical section taken substantially along the line 9—9 of FIG. 7 and showing particularly the probes, punches and interposer linkages together with an exemplary switch mechanism for conditioning the comparator apparatus of the present invention.

In consequence of the foregoing construction, when a tag 21 is positioned on the gate 40 and the latter is pivoted to its closed position, certain of the probes 36 will be alined with stations having perforations 28 located therein while the remainder of the probes 36 will be alined with unperforated stations on the tag. Referring to FIG. 9, it will be observed that the tag 21 contains perforations 28 only at the two uppermost levels, i.e., levels L1 and L2 in the exemplary code shown in FIG. 2, thus representing the character "3" according to that code. Therefore, the corresponding probes **36*a*, 36*b* will be alined with such perforations and will pass therethrough into the corresponding bores 45 formed in the gate. Stated another way, the probes 36*a*, 36*b* "sense" the presence of perforations and will not be shifted in an endwise direction when the gate is closed. However, the ends of each of the probes 36*c*–36*e* in that particular line of probes shown in FIG. 9 will engage unperforated stations on the tag 21 and will be prevented from entering the corresponding bores 45 in the gate. Hence, these probes "sense" the absence of perforations and will be shifted in an endwise direction (to the right as viewed in FIG. 9) as the gate 40** is closed.

Figure 11:
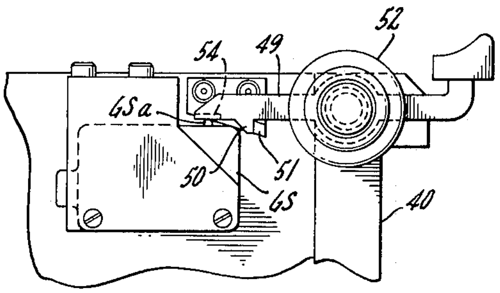
FIG. 11 is a fragmentary left side elevation of the apparatus shown in FIG. 1 disclosing particularly the latching mechanism for the gate.

A snap-acting latch member 49 is mounted on the gate 40 for the purpose of holding the later in its fully closed position. As best illustrated in FIG. 11, the latch member 49 includes a downwardly projecting tab portion 50 positioned to engage a latching stud 51 integral with the frame of the head 38 and extending laterally therefrom. The latch member 49 is mounted on a handle 52 which projects laterally from the side of the gate 40, thus permitting the gate to be readily latched and unlatched simply by rotating the handle. An inwardly projecting ear 54 is formed on one end of the latch member 49 and is adapted to engage and depress the switch actuator $GS_a$ of a normally open gate switch GS when the gate 40 is closed and latched. The gate switch has normally open contacts GS–1 shown in FIGS. 13–16 and normally open contacts GS–2 shown in FIG. 16, and the function of these contacts will be described in conjunction with the overall control circuit for the perforation reproducing apparatus 20.

Since the perforating mechanism 35 is simply representative of one of many types of utilization devices with which the present invention might find application, it will not be described in detail herein. Those interested in such details are referred to the aforementioned Dreyer et al. Briefly, however, the perforating mechanism includes a rectangular array of punches corresponding to the rectangular array of sensing probes 36 described above, one line of such punches **55*a*–55*e* being shown in FIG. 9. The punches are supported on a lifter plate 56 carried by the head 38 with freedom for limited endwise sliding movement in alined openings formed in horizontal guide plates 58. The lower ends of the punches terminate in a common punching plane spaced above a suitable die block 59 mounted on the base 60 of the apparatus 20 so as to define a transverse slot 61 suitable for reception of a second record medium, e.g., the film strip 29 shown in FIG. 5. The punches in each line are progressively staggered in length with punch 55*a* being the longest and punch 55*e*** being the shortest.

In order to condition the punches, there is provided a linkage mechanism for interconnecting corresponding punches and probes. To this end, a plurality of horizontally disposed interposers 62a–62e are carried by the head 38 with freedom for independent sliding movement to and from positions in which one end of the interposers overlie the upper end of the corresponding punches 55a–55e. The opposite ends of the interposers 62a–62e are respectively connected to corresponding probes 36a–36e by relay arms 64a–64e, the latter being pivotally mounted on support bars 65a–65e integral with the head 38. As illustrated in FIG. 9, each of the relay arms is yieldably biased in a counterclockwise direction by leaf springs 66 which tend to urge the uppermost ends of the relay arms into abutment with the staggered ends of the probes 36a–36e respectively. It will be apparent therefore that when a particular sensing probe is shifted to the right (i.e., that probe sensing the absence of a perforation in the tag 21), the corresponding relay arm will pivot in a clockwise direction about its pivot point, thus retracting the corresponding interposer so that the latter is not positioned over its associated punch. For example, since the probes 36c–36e have been shifted upon sensing the absence of perforations in the tag 21 representative of the character "3," the corresponding interposers 62c–62e are retracted. Thus, only interposers 62a and 63b overlie the upper ends of their associated punches. Therefore, to produce perforations in the second record medium representative of the character "3," it is merely necessary to effect relative closing movement between the head 38 and the base 69. When this occurs those punches (i.e., punches 55a and 55b) having an interposer positioner thereover are affirmatively driven downwardly through the second record medium and into alined bores 68 formed in the die plate 59. All other punches, i.e., punches 55c–55e, simply engage and rest upon the second record medium, sliding upwardly within the head 38 as the latter is lowered and, therefore, producing no perforation in the second document.

To produce this relative closing movement between the head 38 and the base 60 so as to drive selected ones of the punches 55a–55e through the second record medium, provision is made for reciprocating the entire head downwardly and upwardly relative to the stationary base. As shown best in FIG. 6, the head is supported on a slide 69 which is coupled to the forward ends of two parallel links 70, 71 by means of pins 72, 74 respectively. The opposite ends of the links 70, 71 are respectively journalled on pintles 75, 76 carried by the frame of the machine. This support of the head 38 by the parallel links 70, 71 assures that the head will reciprocate with linear motion as an eccentric shaft 78 coupled by a pitman 79 to the link 70 executes one revolution. The eccentric shaft 78 is carried on the output member of a one revolution clutch, generally indicated at 80 in FIG. 12, having its input member connected to the output of a speed reducing gear box 81. Mechanical power input to the gear box 81 is derived from an electric motor 82 having a worm gear 84 on its output shaft meshing with a cooperating worm wheel 85 which forms the input to the gear box.

Figure 12:
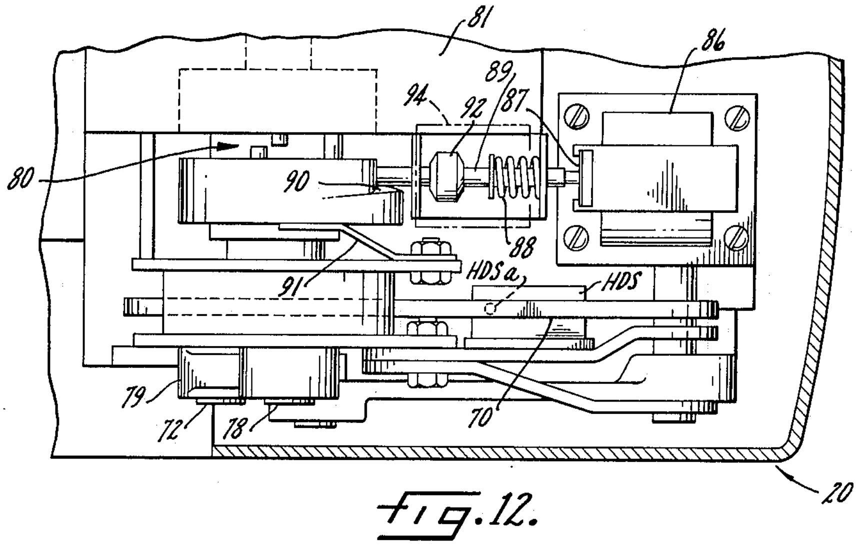
FIG. 12 is a fragmentary section taken substantially along the line 12—12 of FIG. 6, illustrating the mechanism employed for limiting operation to a single perforating cycle.

To insure that the head 38 will only move through one cycle of vertical reciprocation during each perforating operation, a clutch control solenoid 86 mounted on the frame of the perforation reproducing apparatus 20, is momentarily energized to retract its armature 87 against the bias of a spring 88. The armature 8 7is rigidly connected to a clutch actuating pin 89, the opposite end of which is normally in abutment with a cam track 90 formed in the driven member of the one revolution clutch 80 (FIG. 12). When the armature 87 is retracted against the bias of the spring 88, the pin 89 is withdrawn from abutment with the cam track 90 and the driven member of the one revolution clutch 80 is urged into coupled relationship with the driving member by means of a leaf spring 91 or the like. As will be described with greater particularity in connection with the control circuitry shown in FIG. 16, means are provided for only momentarily energizing the solenoid 86. The bias provided by the spring 88 tends to urge the pin 89 back into engagement with the cam track 90 when the solenoid is deenergized, thus tending to uncouple the driving and driven clutch members. Retraction of the armature 87 also shifts the cam 92 formed thereon inwardly (FIG. 6) thereby actuating a motor control switch 94, the latter being deenergized as the eccentric shaft 78 completes one full revolution and the pin 89 snaps back into its original position in the cam track 90, thereby uncoupling the driving and driven clutch members.

With this basic understanding of the environmental perforation reproducing apparatus described above and the general mode of operation thereof, it is now appropriate to discuss the novel comparator apparatus for verifying the validity of signal information representative of diverse characters formed on a record medium and with which the present invention is primarily concerned.

In accordance with one of the important aspects of the present invention, provision is made for detecting the total number of indicia spots sensed in any one character-representative line on a record medium so as to permit correlation of that number with the actual number of spots present in any given valid character according to the predetermined code being utilized. In the preferred form of the invention, this is accomplished by detecting the total number of sensing elements in any one line which have undergone a change in state due to either the presence or absence of an indicia spot at the corresponding station on the record medium. With the feelers or probes 36 used in the exemplary perforation reproducing apparatus 20 to mechanically sense the presence or absence of perforations, provision is made for detecting either the total number of probes in each line thereof which are shifted when the gate 40 is closed or, conversely, the total number which are not shifted.

Figure 10:
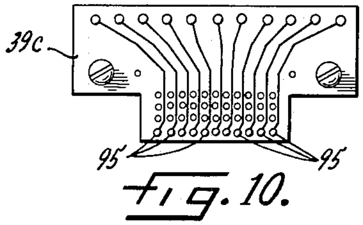
FIG. 10 is an elevational view taken substantially along the line 10—10 of FIG. 9 and disclosing the details of one of the switch boards shown in FIG. 9.

Referring to FIGS. 9 and 10 conjointly, it will be observed that the guide plates 39b–39f (plate 39c being shown in FIG. 10) have formed thereon a plurality of stationary contacts 95. The plates 39b–39f may, for example, be made of insulating material such as plastic or fiberglass, and the stationary contacts 95 (and the leads thereto) may be applied to the plates by any of the conventional printed circuit techniques. In the exemplary apparatus there are eleven such contacts 95 disposed in side-by-side relation on each of the plates 39b–39f. It will be apparent therefore, that each of the plates 39b–39f include one contact 95 respectively corresponding to each of the eleven lines 26 of character-representative indicia formed on the tag 21. Since the arrangement of switch contacts is identical for each of the eleven vertical lines of sensing probes, the present description will be directed to a single line of probes and their associated switch contacts, it being understood that the description is equally applicable to each remaining line.

In order to condition the switches associated with the stationary contacts 95 in accordance with the existing states of the associated sensing elements, provision is made in the illustrative apparatus for closing each switch corresponding to a probe which has "sensed" the absence of a perforation. To this end, movable switch members in the form of elongate, conductive spring wires 96a–96e (FIG. 9) are rigidly mounted on the relay arms 64a–64e respectively. Each movable switch member is connected directly to ground in any convenient manner, as for example by connecting the wires 96a–96e directly to the frame of the apparatus 20 (e.g., to the particular one of the bars 65a–65e which pivotally support the corresponding relay arm). The upper ends of the movable switch members or spring wires 96a–96e project rearwardly and upwardly from the upper ends of their associated relay arms (FIG. 9).

The arrangement is such that when any given probe is shifted rearwardly (i.e., when that probe "senses" the absence of a perforation) and its associated relay arm pivots in a clockwise direction, the switch member mounted on that relay arm engages the alined stationary contact 95 on the guide plate immediately behind the interposer, thus closing that switch. It will be appreciated, therefore, that the switches act as "bi-state" devices—i.e., when in the "closed" state they sense information indicative of the absence of indicia spots, and when in the "open" state they sense information indicative of the presence of indicia spots. Again considering the exemplary case where the character "3" is being sensed by the probes 36, it will be apparent that when the probes 36*c*–36*e* shift rearwardly upon "sensing" the absence of perforations in the tag 21, the corresponding relay arms 64*c*–64*e* pivot in a clockwise direction and the spring wires 96*c*–96*e* engage the alined contacts 95 on the plates 39*d*–39*f* respectively, thus closing the three associated switches. Since the probes 36*a* and 36*b* "sense" the presence of a perforation in the tag 21, they are not shifted and consequently the spring wires 96*a* and 96*b* remain spaced from the corresponding contacts 95 on the plates 39*b* and 39*c*; i.e., the two switches associated therewith remain open.

In carrying out the present invention, there is provided a novel comparator apparatus, generally indicated at 98 (FIGS. 13 and 14), for verifying the validity of the signal information detected by the sensing elements 36 and representative of a plurality of diverse characters, which apparatus includes means for indicating when the signal information sensed is representative of one or more invalid characters. In the exemplary form of the invention, the switches associated with each line of probes have their stationary contacts 95 and their movable switch members 96*a*–96*e* arranged such that a change in state of any one or more of the switches will vary an electrical value which may then be compared with an electrical value corresponding to signal information representative of a valid character. In order to facilitate an understanding of the comparator apparatus 98, there is illustrated in FIG. 14 a simplified schematic wiring diagram of that portion of the apparatus for verifying the signal information sensed by only a single line of sensing elements.

In keeping with the foregoing aspect of the invention, the bi-state devices (i.e., the switch members 95, 96*a*–95, 96*e* which sense the quantum of indicia spots present in the coded representation of a character) are associated with means to produce an electrical value which is correlated with the quantum of sensed indicia spots. Moreover, a reference electrical value, correlated with the number or quantum of indicia spots present in a valid character representation, is established. The two electrical values are then compared, and any detected substantial disagreement therebetween is caused to signal the presence of an error in the character representation. The two electrical values may, for example, be voltages, current, or resistances. However, in the exemplary embodiment here illustrated, the two electrical values are voltages which correspond to the impedance ratios in two respective voltage dividers one of which is changed or controlled by the bi-state devices described above.

For this purpose, a bridge circuit is employed which may take the form of a Wheatstone bridge 99 (FIG. 14) having two pairs of arms 100, 101 and 102, 103 respectively. A plurality of impedances, which here take the form of resistances R1, R2, R3 and R4 are connected in the arms 100–103 respectively. The bridge 99 is energized by connecting its junctions 106, 108 across a suitable voltage source here diagrammatically represented as an A.C. voltage source having terminals 104, 105. The connection to the A.C. voltage source is through normally open contacts GS–1 of the gate switch GS, so that the bridge will be excited automatically when the gate 40 (FIGS. 1 and 9) is closed.

Those skilled in the art will appreciate that a bridge circuit of the foregoing type is, in effect, two voltage dividing networks in which provision is made for comparing the voltage levels at junctions respectively formed in the two voltage dividers. In such an arrangement, and assuming that one arm (e.g., arm 101) of the bridge 99 includes a variable impedance having an equivalent impedance value R*eq*, the bridge 99 is balanced when the impedance values are such that the following equation is satisfied:

$$(1)\qquad \frac{R1}{Req}=\frac{R3}{R4}$$

where R*eq* represents the total equivalent impedance of the arm 101 including resistance R2.

Conversely, the bridge 99 is unbalanced, and an appreciable voltage difference exists between the junctions 111 and 112, when the ratio of the impedance value of arm 100 with respect to arm 101 is unequal to the ratio of the impedance value of arm 102 with respect to arm 103. That is, the bridge 99 is unbalanced when the following equation is satisfied:

$$(2)\qquad \frac{R1}{Req}\neq\frac{R3}{R4}$$

Of course, by selection of a suitable detector which responds only to appreciable unbalance conditions in the bridge circuit 99 (i.e., a condition where the voltage difference between the two junctions 111, 112 is more than a predetermined amount), provision can be made for detecting either a balanced or substantially balanced bridge condition where the ratio of the impedance value of arm 100 with respect to arm 101 is approximately equal to the ratio of the impedance value of arm 102 with respect to arm 103. That is, the bridge 99 is balanced or approximately balanced when the following equation is satisfied:

$$(3)\qquad \frac{R_1}{Req}\simeq\frac{R3}{R4}$$

Keeping in mind these basic considerations applicable to bridge circuits or voltage divider networks, provision is made in the exemplary form of the invention for varying the equivalent resistance R*eq* of one arm of the bridge 99, for example, arm 101. This is accomplished by connecting a plurality of fixed resistances R*a*–R*e* in parallel with the arm 101, the resistances R*a*–R*e* being connected in series with the contacts of switches 96*a*–96*e* respectively. Thus, when any particular one of the normally open switches is closed (i.e., when the sensing element associated with that switch has "sensed" the absence of an indicia spot in the tag 21), the corresponding one of the resistances R*a*–R*e* will be connected in parallel with the resistance R2 in the arm 101. If, however, any given sensing element "senses" the presence of an indicia spot in the tag 21, its associated switch will remain open and the corresponding one of the resistances R*a*–R*e* will be disconnected from the bridge 99.

Merely by way of example, let it be assumed that the resistances R1, R3 and R*a*–R*e* are all of like value, e.g., approximately 10,000 ohms, the resistance R2 is approximately 9,000 ohms and the resistance R4 is approximately 2,500 ohms. In such an arrangement, the equivalent resistance R*eq* of arm 101 is determined by the equation $$(4)\qquad \frac{1}{Req}=\frac{1}{R2}+\frac{1(x)}{Ra}+\frac{1(x)}{Rb}+\frac{1(x)}{Rc}+\frac{1(x)}{Rd}+\frac{1(x)}{Re}$$

where $x$ represents the existing state of each switch and is equivalent to 1 when the associated switch is closed and 0 when the switch is opened.

Considering the exemplary case wherein the character "3" has been "sensed" by the sensing elements 36, thus closing the switches associated with the probes 36*c*–36*e*, the resistances R*c*–R*e* are connected in parallel with resistance R2 while the resistances R*a* and R*b* (corresponding to those probes which "sense" the presence of a perforation) are disconnected from the bridge. Therefore, substituting in Equation 4

$$\frac{1}{Req}=\frac{1}{9{,}000\Omega}+\frac{1(0)}{10{,}000\Omega}+\frac{1(0)}{10{,}000\Omega}+\frac{1(1)}{10{,}000\Omega}+\frac{1(1)}{10{,}000\Omega}+\frac{1(1)}{10{,}000\Omega}$$

and $Req$ is approximately equal to 2,432 ohms. Since the values of the various commercially procured non-precision resistances are not generally held within precise tolerances and may vary somewhat from resistance to resistance, those skilled in the art will appreciate that the actual equivalent resistances of the networks may vary somewhat. However, for the purpose of the present description, it may be considered that the value of $Req$ approximates the value of the resistance of arm 104, i.e., 2,500 ohms, when two switches and only two of the switches **96*a*–96*e* are open. Therefore, taking the value of $Req$ derived from solving Equation 4 above and substituting it into Equations 1, 2 and 3, it will be observed that the conditions set forth in Equation 3 are satisfied and the bridge 99** will be substantially balanced. That is, $$\frac{10{,}000\Omega}{2{,}432\Omega}\simeq\frac{10{,}000\Omega}{2{,}500\Omega}$$

Since the predetermined code system shown in FIG. 2 contemplates two and only two indicia spots for any valid character, it will be appreciated that the bridge 99 will be balanced irrespective of which one of the diverse characters is sensed, provided that two indicia spots in a five-station line are sensed.

It will be readily apparent from the foregoing description that if the sensing elements 36 detect the presence of other than two spots of indicia (e.g., 1, 3, 4 or 5 perforations), or if one or more of the sensing elements are broken or otherwise incapacitated, the signal information transmited to the utilization device will not be representative of any valid character. Consequently, other than three of the movable switch members **96*a*–96*e*** will be shifted, thus closing other than three switches and opening or leaving other than two of the resistances R*a*–R*e* disconnected from the bridge 99. When this occurs the value of $Req$ will be appreciably changed. Merely by way of example, if the sensing mechanism 34 detects the presence of only one indicia spot, four of the movable switch members (e.g., members **96*b*–96*e***) will be shifted and the corresponding four switches will close. Again substituting in Equation 4

$$\frac{1}{Req}=\frac{1}{9{,}000\Omega}+\frac{1(0)}{10{,}000\Omega}+\frac{1(1)}{10{,}000\Omega}+\frac{1(1)}{10{,}000\Omega}+\frac{1(1)}{10{,}000\Omega}+\frac{1(1)}{10{,}000\Omega}$$

and $Req$ is approximately equal to 1,956 ohms. Similarly, if three indicia spots are sensed, two switches will close and $Req$ will be approximately 3,214 ohms. If four indicia spots are sensed, one switch will close and $Req$ will approximately equal 4,736 ohms. Finally, if five indicia spots are sensed, all of the switches will remain open and $Req$ will be approximately equal to 9,000 ohms.

If the above values of $Req$ (derived from solving Equation 4 when one, three, four or five indicia spots are sensed) are then substituted in Equations 1, 2 and 3, it will be observed that only the requisite conditions of Equation 2 are satisfied, i.e., $$\frac{10{,}000\Omega}{1956\Omega}\neq\frac{10{,}000\Omega}{2{,}500\Omega}$$

or $$\frac{10{,}000\Omega}{3{,}214\Omega}\neq\frac{10{,}000\Omega}{2{,}500\Omega}$$

or $$\frac{10{,}000\Omega}{4{,}736\Omega}\neq\frac{10{,}000\Omega}{2{,}500\Omega}$$

or $$\frac{10{,}000\Omega}{9{,}000\Omega}\neq\frac{10{,}000\Omega}{2{,}500\Omega}$$

Consequently, since the requisite conditions for satisfying Equation 1 and Equation 3 are not present, the bridge 99 will be unbalanced.

Of course, those skilled in the art will appreciate that by proper selection of the various resistances, the bridge circuit may be adjusted so that it will be balanced when other than two switches are open, thus permitting the invention to be used to verify the validity of signal information representative of characters in other codes, e.g., a three out of five place code.

In carrying out the present invention, provision is made for comparing electrical values representative of the fixed and variable impedance networks, and for actuating an appropriate alarm circuit when the values are dissimilar so as to permit operation of an associated utilization device to be inhibited. To this end, and referring to the exemplary Wheatstone bridge circuit illustrated in FIG. 14, a balance detector, here shown as a transistor 110, is connected to the bridge 99 as a conventional common emitter amplifier with its emitter-base circuit coupled directly to the junctions 111, 112 of the pairs of bridge arms 102, 103 and 100, 101 respectively. The collector **110*c* and the emitter 110*e* of the amplifier 110 are respectively connected to the negative terminal 114 and positive terminal 115 of a suitable D.C. power supply (not shown), the collector circuit including a series connected load resistor 116. The arrangement is such that when the bridge 99 is balanced, or approximately balanced (i.e., when the signal information sensed is representative of a valid character), no appreciable current flows in the emitter-base circuit of the amplifier 110 and the latter remains in its OFF state. In other words, the voltage level at junction 111 is equal to, or approximately equal to, the voltage level at junction 112. However, when the bridge 99 is unbalanced (i.e., when the signal information sensed is not representative of any valid character and other than two switches remain open), appreciable current flows in the emitter-base circuit of the amplifier 110, turning the latter ON during alternate half waves of the A.C. voltage applied across the bridge terminals 106, 108. Stated another way, the voltage level at junction 111 is appreciably different from the voltage level at junction 112. During the periodic intervals when the amplifier 110 is turned ON, current flows from the positive terminal 115 through the emitter and collector of the amplifier 10 and a series load resistor 116**, thus causing periodic potential drops across the latter.

For the purpose of inhibiting operation of the associated utilization device whenever the presence of invalid signal information is detected, the load resistor 116 for the amplifier 110 is coupled to the base **118*b* of a second common emitter amplifier 118 through a coupling capacitor 119. The emitter 118*e* of the amplifier 118 is coupled directly to the positive power supply terminal 115 while the collector 118*c* is coupled to one side of a "punch suppress" relay coil PSR. In the exemplary apparatus, the punch suppress relay PSR is provided with a pair of normally closed contacts PSR–1 and a pair of normally open contacts PSR–2**.

Assuming that the bridge circuit is unbalanced due to the presence of invalid signal information, thus causing the amplifier 110 to be periodically turned OFF and ON during alternate half waves of the A.C. voltage applied to the bridge, those skilled in the art will appreciate that the coupling capacitor 119 which is connected to the collector 110$c$ will periodically charge and discharge. To permit the capacitor 119 to discharge when the amplifier 110 is turned ON, the former is coupled to an asymmetrically conductive device, here shown as a diode 120, which is disposed in parallel with a resistance 121. The circuit arrangement is such that when the amplifier 110 is turned ON, the coupling capacitor 119 discharges through the device 120. When the capacitor has dissipated its charge and the amplifier 110 is momentarily turned OFF, the capacitor is then recharged by current flow through the emitter-base circuit of the normally OFF amplifier 118, thus turning the amplifier 118 ON and completing an energizing circuit from the terminal 115 through the emitter 118$e$, collector 118$c$, and the punch suppress relay coil PSR to the negative power supply terminal 114. A smoothing capacitor 122 is connected across the relay coil PSR so as to insure that the latter will remain energized during the periodic OFF intervals of the amplifier 118. When the punch suppress relay coil is energized, the normally closed relay contact PSR–1 (which are connected in series with the motor 82 for the utilization device as shown in FIG. 16) open, thus breaking the energizing circuit for the motor and precluding operation of the utilization device. Simultaneously, the normally open relay contacts PSR–2 are closed, completing an energizing circuit for a suitable indicating device, here shown as a warning light 124, thereby providing a visual indication for the operator that the sensing mechanism 34 has detected the presence of signal information representative of an invalid character.

Figure 13:
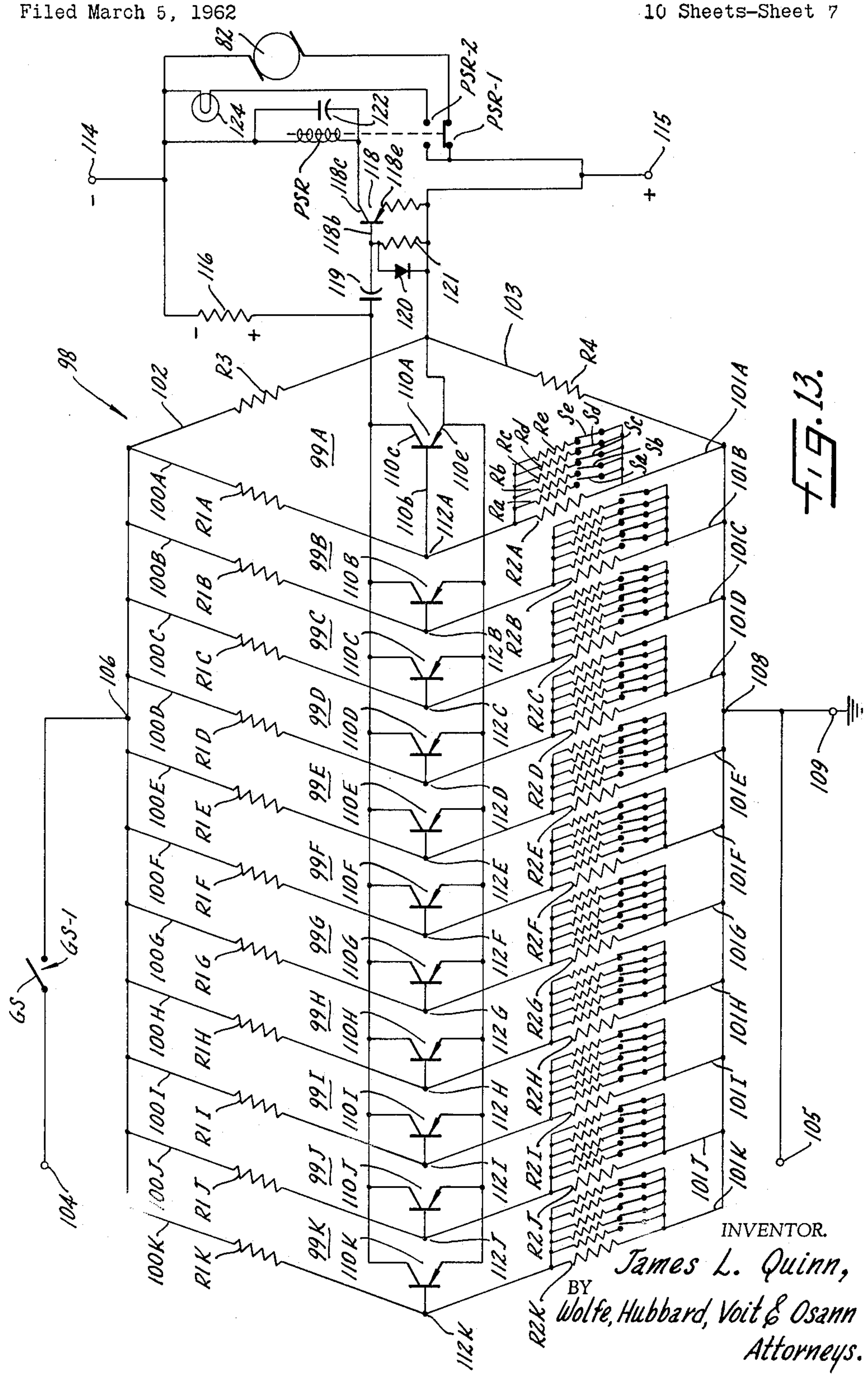
FIG. 13 is a schematic diagram of an exemplary comparator circuit embodying the features of the present invention and illustrating an arrangement for verifying the validity of signal information representative of a plurality of characters formed in a record medium in accordance with the code shown in FIG. 2.

Referring now to FIG. 13, it will be observed that the comparator circuit described above in connection with FIG. 14, may, by duplicating only a few of the circuit components, be modified to permit its use in simultaneously detecting the validity or invalidity of any one or more of a plurality of diverse character representations. As here illustrated, the comparator apparatus 98 is designed to simultaneously verify the validity of signal information representative of all eleven lines 26 of character-representative indicia formed on the tag 21 in accordance with the predetermined code system shown in FIG. 2, and to produce an output signal in the event that such signal information is representative of at least one invalid character. To accomplish this, there are provided a plurality of Wheatstone bridge circuits 99A–99K, each of which includes a respective first pair of arms 100A, 101A–100K, 101K. The bridge circuits 99A–99K, also include a second pair of arms 102, 103 which are common to all eleven circuits. Resistances R1A–R1K are respectively connected in the arms 100A–100K and resistances R2A–R2K are respectively connected in the arms 101A–101K in a manner identical to that heretofore described in connection with FIG. 14.

In order to vary the electrical value representative of the resistance ratio of the first pair of arms of any given bridge circuit 99A–99K, each of the arms 101A–101K is provided with a plurality of resistances R$a$–R$e$ connected in parallel across the corresponding one of the resistances R2A–R2K, each resistance R$a$–R$e$ having a series connected, normally open switches S$a$–S$e$ respectively. Thus, when the gate 40 of the sensing mechanism 34 is closed, all fifty-five bi-state devices or switches S$a$–S$e$ are simultaneously conditioned in either a closed state (i.e., the associated probe having "sensed" the absence of a perforation) or an open state (i.e., the associated probe having "sensed" the presence of a perforation). Assuming that all eleven lines of sensing probes 35 sense the presence of valid characters, each of the eleven bridge circuits will be balanced or approximately balanced. If, however, any one line of sensing probes detects the presence of invalid character-representative information, the particular bridge circuit associated therewith will be appreciably unbalanced. Merely by way of example, if it is assumed that the sixth line of probes senses the presence of three perforations instead of two, the three switches corresponding thereto in bridge circuit 99F will remain open. As shown in FIG. 13, the switches S$a$–S$c$ are open, thus indicating the presence of invalid signal information. Consequently, the resistance ratio of arms 100F, 101F will be appreciably dissimilar from the resistance ratio of arms 102, 103 and the bridge 99F will be unbalanced.

For comparing the resistance ratio of arms 102, 103 with the resistance ratio of each pair of arms 100A, 101A–100K, 101K, a plurality of balance detectors are provided, there being one such detector or amplifier 110A–110K associated with each of the bridges 99A–99K respectively. The emitters 110$e$ of all the amplifiers 110A–110K are connected directly to the junction 111 of the common bridge arms 102, 103 and thence to the positive power supply terminal 115. The bases 110$b$ of all the arms 110A–110K are connected directly to the junctions 112A–112K respectively of the other pair of arms in the associated bridge circuits. Finally, the collectors 110$c$ of all the amplifiers 110A–110K are connected in common to both the negative power supply terminal 114 through a common load resistor 116, and to the base 118$b$ of the common emitter amplifier 118 through a capacitor 119. It will be apparent that the foregoing arrangement of circuit components insures that the amplifier 118 will be turned ON when any one or more of the amplifiers 110A–110K are turned OFF after the latter have conducted on a positive half cycle of the A.C. voltage applied across the terminals 106, 108. Since the bridge 99F illustrated in FIG. 13 is unbalanced as hereinabove discussed, its amplifier 110F is periodically turned ON and OFF during alternate half cycles of the A.C. voltage applied across the terminals 106, 108 of the bridge circuits, and consequently the amplifier 118 is turned ON each time the coupling capacitor 119 is recharged, thus energizing the punch suppress relay PSR.

Turning next to FIG. 15, there is illustrated a modified form of comparator apparatus 125 in which provision is made for verifying the validity of signal information representative of character indicia formed on a record medium in accordance with the predetermined code shown in FIG. 3. To facilitate an understanding of this form of the invention, the circuit shown in FIG. 15 comprises that portion of the comparator apparatus which produces a "punch suppress" signal when the signal information sensed by a single line of sensing elements represents other than a valid character, it being understood that a valid character may be represented by either two or four indicia spots in a given line.

For the purpose of verifying the validity of signal information representative of characters which may be designated by either two or four spots of indicia in any one line, the comparator apparatus 125 includes a multiple bridge circuit 126 having, in effect, one variable impedance network and two fixed impedance networks, the latter corresponding respectively to the two possible quanta of indicia spots which can represent a valid character. To accomplish this, the bridge circuit includes a first variable impedance network in the form of a pair of arms 128, 129 which are substantially identical to the arms 100, 101 described in connection with FIG. 14 and which respectively include resistances R1′ and R2′. A plurality of like resistances R$a'$–R$e'$ are connected in parallel with resistance R2′ and are adapted to be individually connected to the bridge 126 by closure of a corresponding series connected switch S$a'$–S$e'$ in a manner identical to that described above in connection with the embodiment shown in FIGS. 13 and 14.

The second impedance network is fixed in value and corresponds to a balancing network for verifying the validity of a character designated by the presence of two indicia spots. As here illustrated, the second network includes three arms 130, 131 and 132 having series connected resistances R3′, RX and R4′ respectively. In this exemplary network, the balancing point 134 for the bridge 126 is located between the arms 131 and 132. In effect, the arms 130, 131 constitute a single arm having a total impedance $R3' + RX$.

The third impedance network is also fixed in value and corresponds to a balancing network for verifying the validity of a character designated by the presence of four indicia spots. As disclosed in connection with FIG. 15, the third impedance network includes the same components as does the second network. However, the balancing point 135 for the bridge 126 is here located between the arms 130 and 131. In other words, the arms 131, 132 constitute a single arm having a total impedance $RX + R4'$.

To detect the presence of invalid signal information, two balance detectors, here shown as common emitter amplifiers 136, 138 are employed. The first detector 136 has its emitter-base circuit connected across the bridge 126 by coupling the emitter **136*e* directly to the balance point 134 and the base directly to the junction 139 of the first pair of arms 128, 129. The second detector 138 is connected to the bridge 126 in like manner by also coupling its base 138*b* to the junction 139 while coupling its emitter 138*e* directly to the balancing point 135. The collectors 136*c*, 138*c* of the amplifiers 136, 138 are respectively coupled to one side of corresponding ones of a pair of balance detector relay coils $BDR_a$, $BDR_b$ having smoothing capacitors 140, 141 connected thereacross. In the exemplary apparatus, the balance detector relays are respectively provided with series connected, normally open contacts $BDR_a$–1, $BDR_b$–1 which are connected directly in the energizing circuit for a punch suppress relay coil PSR′. As with the modification illustrated in FIG. 14 and discussed above, each of the balance detectors 136, 138 are normally OFF and remain in this state when the contacts GS–1 close, providing the associated bridge circuit is balanced about its respective balance point 134, 135. However, if the bridge circuit is unbalanced about either point 134 or point 135, the corresponding balance detector is turned ON and current flows from the positive power supply terminal 115** through the now ON balance detector, thus completing an energizing circuit for the associated balance detector relay.

Let it now be assumed that the sensing mechanism 34 has detected the presence of signal information representative of the presence of a valid character designated by the presence of two indicia spots in a line. In this instance, two of the switches *Sa′–Se′* are open and the bridge 126 is balanced about the point 134. That is, the voltage level at point 134 is substantially equal to the voltage level at point 139. Consequently, the balance detector, or amplifier, 136 remains in its OFF state and the contacts $BDR_a$–1 remain open. However, the bridge 126 is unbalanced about point 135, i.e., on positive half cycles of the A.C. source, the voltage at point 135 is considerably more positive than that at point 139. Thus, current will flow through the emitter-base junction of the transistor 138. Consequently, the amplifier 138 is turned ON during alternate half waves of the A.C. voltage applied across the terminals 106′, 108′ of the bridge, thus completing an energizing circuit through the balance detector relay coil $BDR_b$ to the negative power supply terminal 114 and closing the contacts $BDR_b$–1. In this condition, with normally open contacts $BDR_a$–1 open and normally open contacts $BDR_b$–1 closed, the punch suppress relay coil PSR′ remains denergized. This is the desired result since the sensed line of stations has been assumed to contain two indicia spots, a valid number.

If it is now assumed that the sensing mechanism 34 has detected the presence of signal information representative of the presence of a valid character designated by four indicia spots in a line, it will be apparent that four of the switches *Sa′–Se′* will open and the bridge 126 will be unbalanced about the point 134, but balanced about the point 135. In this condition, the balance detector 136 is turned ON while the detector 138 remains OFF. Consequently, the balance detector relay $BDR_a$ is energized, closing its contacts $BDR_a$–1, while the balance detector relay $BDR_b$ remains deenergized and its contacts $BDR_b$–1 remain open. Since the latter contacts remain open, the punch suppress relay PSR′ remains deenergized. Again, this is a desired result.

Let it next be assumed that the sensing mechanism 34 has detected the presence of signal information representative of other than two or four spots of indicia in a single line (i.e., one, three or five spots). In this condition, either one, three or five of the switches *Sa′–Se′* will remain open and the bridge 126 will be unbalanced about both points 134 and 135. As a result, both detectors 136, 138 will be turned ON, both relay coils $BDR_a$, $BDR_b$ will be energized, and both sets of contacts $BDR_a$–1, $BDR_b$–1 will close, thus completing an energizing circuit through the punch suppress relay coil PSR′ to the negative power supply terminal 114. When the coil PSR′ is energized, its normally closed contacts PSR′–1 open, breaking the energizing circuit for the motor 82. Simultaneously, the normally open contacts PSR′–2 close, completing an energizing circuit for the warning light 124 and indicating to the operator that the presence of invalid signal information has been detected.

Those skilled in the art will readily appreciate that the comparator circuit shown in FIG. 15 may be further modified to permit verification of the validity of signal information representative of characters in codes wherein individual characters may be represented by other than two or four indicia spots. For example, if a valid character can be represented by either one, three or five perforations, it is merely necessary to select three appropriate balance points on the bridge circuit with each point respectively corresponding to a different one of the three possible quantum variations of spots representative of different valid characters. In such an instance, three balance detectors would be employed for respectively controlling three relays having normally open, series connected contacts. Thus, the punch suppress relay would be energized only when all three relays were energized, i.e., when all three balance detectors had sensed an unbalanced bridge condition. Moreover, it will be apparent to those skilled in the art that a plurality of bridge circuits 126 and their associated balance detectors may be arranged in side-by-side relationship (in a manner similar to that illustrated in FIG. 13 and with one set of common arms 130, 131, 132) to control two balance detector relays so as to enable verification of the validity of a plurality of sets of signal information simultaneously.

It will be noted that the embodiment of the invention shown in FIG. 15 does not employ an amplifier corresponding to the amplifier 118 shown in FIGS. 13 and 14. Those skilled in the art will appreciate that the amplifier 118 could also be eliminated from the circuits shown in FIGS. 13 and 14 and a balance detector relay substituted therefor in a manner similar to that described in connection with FIG. 15.

A brief cycle of operation for the exemplary perforation reproducing apparatus 20 will now be reviewed, it being assumed that all of the lines 26 of indicia spots on the tag 21 represent valid character-representative information in accordance with the code disclosed in FIG. 2.

To initiate an operating cycle, it is merely necessary for the operator to place a tag 21 (FIG. 4) on the gate 40 with the positioning studs 42, 44 (FIG. 6) registered with the corresponding positioning holes 22, 24 in the tag. The gate 40 is then pivoted in a clockwise direction (as viewed in FIGS. 6 and 9) until the snap-acting latch member 49 engages the latching stud 51 on the head 38 to hold the gate 40 in the closed position (FIG. 11). When the gate closes, those probes 36 sensing the presence of a perforation are received within the alined bores 45 formed in the gate and hence do not shift in an endwise direction. However, those probes 36 which sense the absence of a perforation engage the face of the tag 21 and are shifted in an endwise direction (to the right as viewed in FIG. 9) by the latter. Since the information formed on the tag is assumed to represent only valid characters according to the predetermined code, three probes 36 in each line thereof will shift, thus closing the three associated switches in each bridge circuit and balancing the fixed and variable impedance networks.

As the same time the sensing probes are conditioned, closure of the gate 40 closes the normally open contacts GS–1 and GS–2 of the gate switch GS, simultaneously applying an A.C. voltage across the comparator bridge circuits and completing an energizing circuit for the clutch release solenoid 86 (FIG. 16). Energization of the solenoid 86 causes withdrawal of the clutch control pin 89 from the cam track 90 in the driven member of the one revolution clutch 80 (FIGS. 12 and 16). As the pin is withdrawn, the cam 92 formed thereon effects closure of the cam switch 94, completing an energizing circuit for the motor 82 through the normally closed punch suppress relay contacts PSR–1. Energization of the motor 82, through suitable reduction gearing 81 and through the one revolution clutch 80, causes rotation of the eccentric drive shaft 78, thus driving the head 38 through a single downward and upward stroke. Upon completion of one full revolution of the eccentric drive shaft 78 and the one revolution clutch, the spring biased clutch control pin 89 snaps back into the cam track 90 on the driven member of the clutch 80, simultaneously uncoupling the one revolution clutch and opening the cam switch 94. When the cam switch 94 opens, the energizing circuit for the motor 82 is broken.

Figure 6:
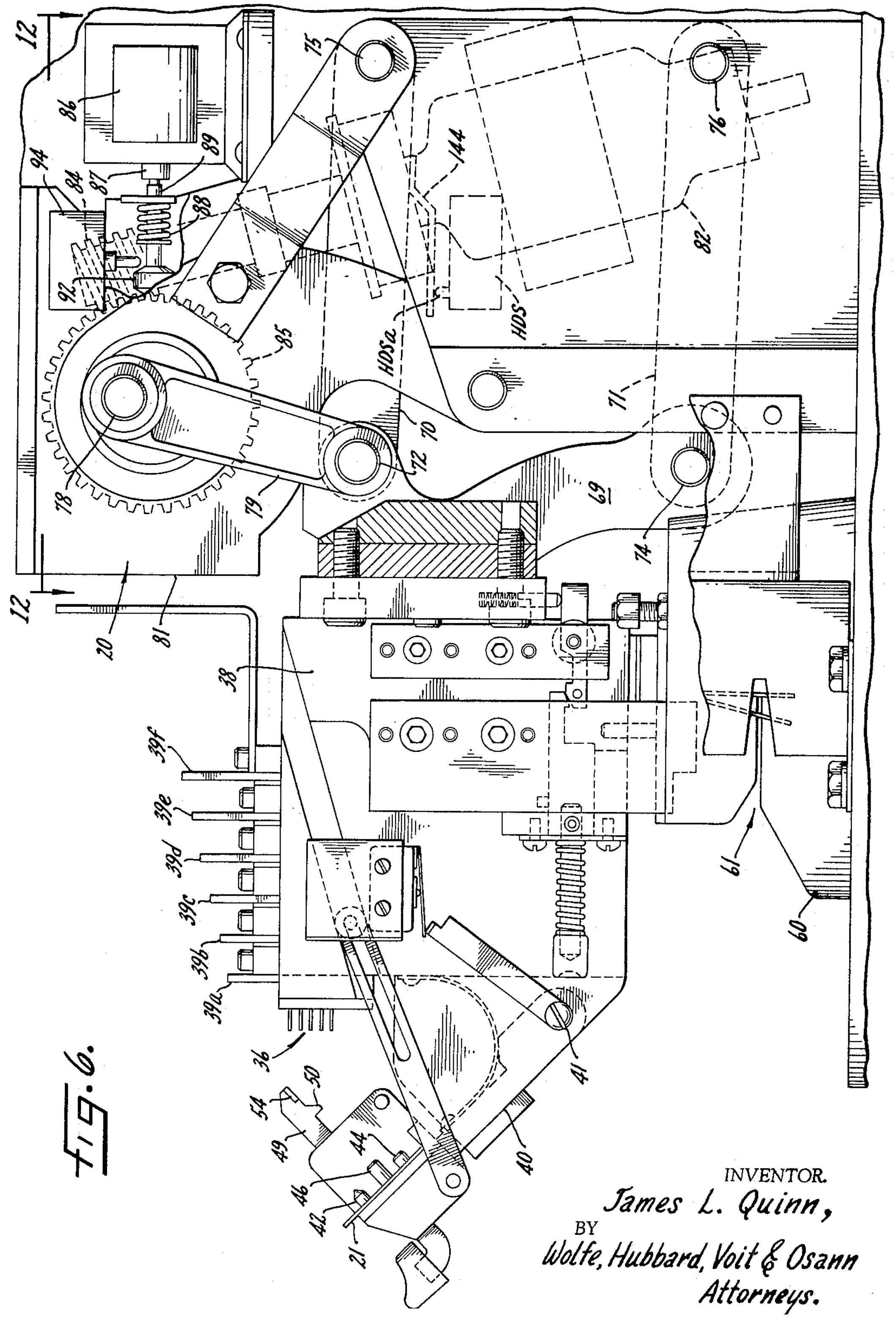
FIG. 6 is a right side elevation of the apparatus shown in FIG. 1.
Figure 7:
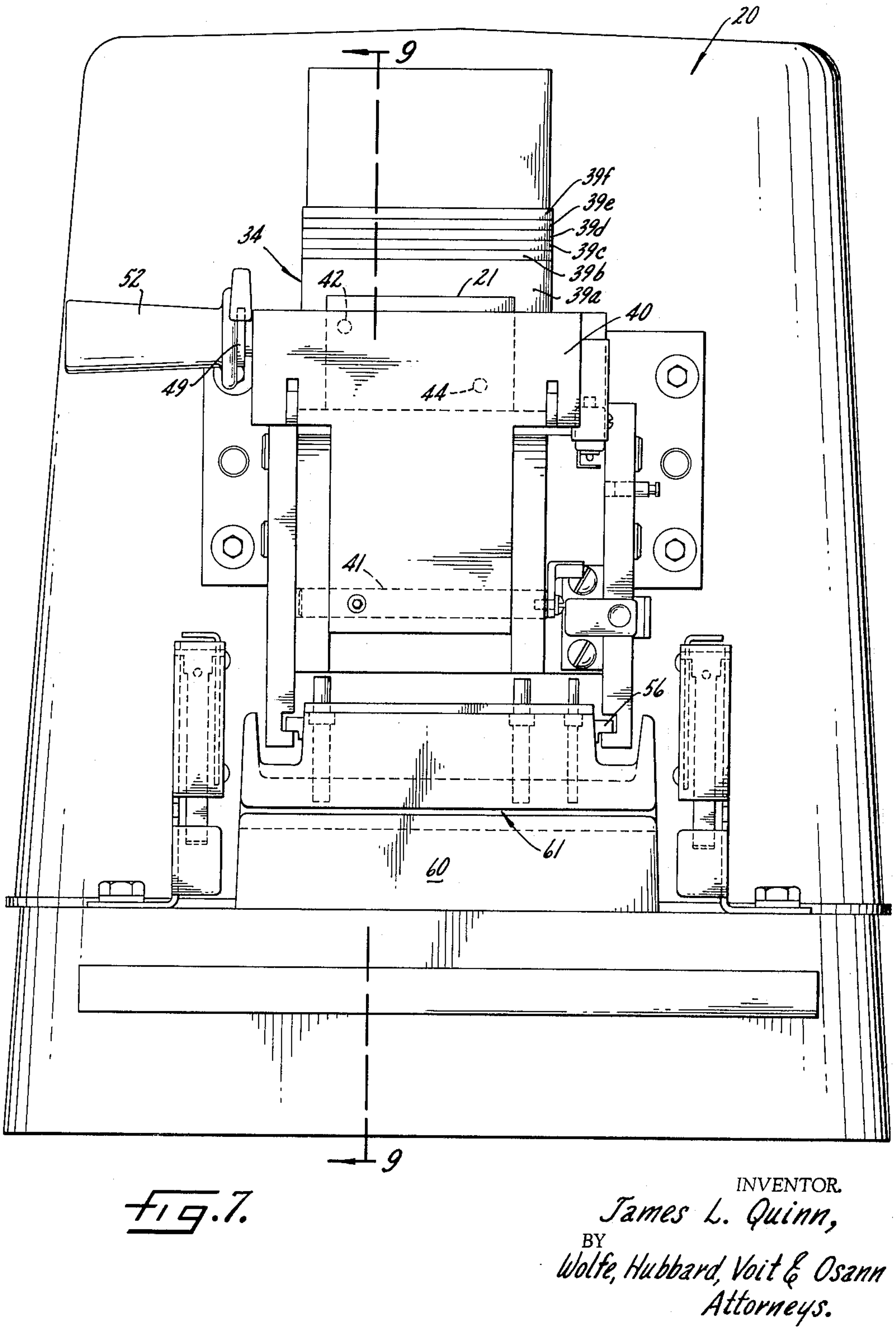
FIG. 7 is a front elevation of the apparatus shown in FIG. 1 with its gate in the closed position.

To eliminate the possibility of the perforation reproducing head 38 moving through a second operating cycle should the gate switch GS stick or should the operator continue to hold the gate 40 in a closed position, control means are provided for insuring that the motor 82 is deenergized upon completion of each cycle of operation. Referring to FIGS. 6 and 16, this is accomplished by mounting a normally open head-down switch HDS on the frame of the apparatus 20 responsive to the vertical position of the head 38. A head-down switch actuator $HDS_a$ is disposed beneath a lever 144 interposed in the path of one of the parallel links, for example, link 70. Thus, as the head 38 moves down, the lever 144 and the head-down switch actuator $HDS_a$ are depressed, closing the normally open head-down switch HDS and completing an energizing circuit for relay R10 which controls normally closed contacts $\mathbf{R10}_a$ and normally open contacts $\mathbf{R10}_b$. When the relay R10 is energized, normally closed contacts $\mathbf{R10}_a$ open to deenergize the solenoid 86 controlling the driven member of the one revolution clutch 80, and the contacts $\mathbf{R10}_b$ close so that the relay R10 remains sealed in as long as the gate 40 and its switch GS remain closed.

If it is now assumed that the signal information sensed by the sensing mechanism 34 contains information representative of one or more invalid characters, it will be apparent that the comparator apparatus 98 (shown diagrammatically in FIG. 16) will produce an output signal resulting from an unbalanced condition between the variable and fixed impedance networks, thus energizing the punch suppress relay PSR upon closure of the gate 40. Energization of the relay PSR opens the normally closed contacts PSR–1, thereby precluding energization of the motor 82. Simultaneously, the normally open contacts PSR–2 close, turning the warning light 124 ON.

It will be apparent that the present comparator apparatus is highly versatile and is susceptible to a wide range of uses since it permits verification of the validity of character-representative signal information by determining the quantum of such information and comparing the value of this quantum with a known value representative of a valid character. Moreover, by selection of appropriate resistance values, the apparatus may be rendered operable for verifying the validity of characters represented by any given number of indicia spots in a single line. Additionally, the basic circuit may, by the modification exemplified in FIG. 15, be rendered operable to verify the validity of signal information representative of characters which can be designated by diverse quanta of indicia spots in any given line.

Although the exemplary apparatus has been described in connection with a perforation reproducing apparatus employing mechanical feelers or probes for detecting the presence of perforations, those skilled in the art will appreciate that it is not so limited in its application. Merely by way of example, if the sensing elements employed are photocells for detecting the presence of opaque indicia spots or the like, energization of such photocells could be used to energize corresponding relays for closing the switch contacts associated with the variable impedance network in the comparator apparatus.

It will be understood from the foregoing description that the particular balance detectors employed in connection with the novel comparator apparatus may take various forms. However, such detectors will generally be of the type that give no response until the electrical unbalance existing between two points reaches a predetermined value. Consequently, if the junctions in the two networks are balanced or approximately balanced, the detector will sense the presence of a "balance" condition, thus producing no output signal, and it is in this context that the term "balance" is used in the following claims.

I claim as my invention:

1. Comparator apparatus for verifying the validity of signal information sensed from a record medium having character-representative indicia spots formed thereon and with all valid characters being represented by a known quantum of spots, comprising, in combination, means for sensing the presence of all of said indicia spots formed on said medium to represent one character, means associated with said sensing means for converting the signal information sensed representative of the character to a first electrical value correlated to the quantum of indicia spots sensed, means establishing a second electrical value correlated to the known quantum of indicia spots representative of all valid characters, and comparing means responsive to said first and second electrical values for indicating the presence of invalid signal information.

2. Compartor apparatus for verifying the validity of signal information sensed from a record medium having character-representative indicia spots formed thereon and with all valid characters being represented by a known quantum of spots, comprising, in combination, means for sensing the presence of all of said indicia spots formed on said medium to represent one character, a first impedance network, means associated with said sensing means for varying the impedance value of said first network in accordance with the quantum of indicia spots sensed, a second impedance network for establishing a second impedance value correlated to the known quantum of indicia spots representative of all valid characters, and comparing means responsive to said first and second impedance values for indicating the presence of invalid signal information.

3. Comparator apparatus for verifying the validity of signal information sensed from a record medium having character-representative indicia spots formed thereon and with all valid characters being represented by one of $n$ known quanta of spots, comprising, in combination, means for sensing the presence of all of said indicia spots formed on said medium to represent a character, means associated with said sensing means for converting the signal information sensed representative of the character to a first electrical value correlated to the quantum of indicia spots sensed, means establishing $n$ second electrical values respectively correlated with the $n$ known quanta of indicia spots representative of valid characters, and means for comparing said first electrical value with each of said $n$ second electrical values to indicate when the signal information sensed is representative of an invalid character.

4. Comparator apparatus for verifying the validity of signal information sensed from a record medium having character-representative indicia spots formed thereon and with all valid characters being represented by one of $n$ known quanta of spots, comprising, in combination, means for sensing the presence of all of said indicia spots formed on said medium to represent a character, a first impedance network, means associated with said sensing means for varying the impedance value of said first network in accordance with the quantum of indicia spots sensed, $n$ second impedance networks for establishing $n$ second impedance values respectively correlated with the $n$ known quanta of indicia spots representative of all valid characters, and comparing means responsive to said first impedance value and each of said $n$ second impedance values for indicating when the signal information sensed is representative of an invalid character.

5. Comparator apparatus for checking the validity of information formed on a record medium and representative of one of diverse characters, said characters being designated by different combinations of indicia located at selected ones of an array of stations on said medium with each combination corresponding to a different character and all of said combinations having indicia located at a predetermined number of said stations, comprising, in combination, means for sensing the presence of indicia at each of said stations, a first resistance network for establishing a known electrical value correlated with said predetermined number of stations, a second resistance network, a plurality of like resistances adapted to be connected in parallel with said second network, means associated with said sensing means for connecting certain only of said like resistances in parallel with said second network to establish a second electrical value, the quantum of said certain only like resistances being correlated with the quantum of indicia sensed, and comparing means responsive to said first and second electrical values for indicating the presence of information representative of an invalid character.

6. Comparator apparatus for checking the validity of information formed on a record medium and representative of one of diverse characters, said characters being designated by different combinations of indicia located at selected ones of an array of stations on said medium with each combination corresponding to a different character and all of said combinations having one of $n$ known quanta of indicia, comprising, in combination, means for sensing the presence of indicia at each of said stations, $n$ first resistance networks for establishing $n$ known electrical values respectively correlated with said $n$ known quanta of indicia, a second resistance network, a plurality of like resistances adapted to be connected in parallel with said second network, means associated with said sensing means for connecting certain only of said like resistances in parallel with said second network to establish a second electrical value, the quantum of said certain only like resistances being correlated with the quantum of indicia sensed, and comparing means responsive to each of said $n$ known values and to said second value for indicating the presence of information representative of an invalid character.

7. Comparator apparatus for checking the validity of signal information formed on a record medium and representative of one of diverse characters, said characters being designated by different combinations of indicia located at selected ones of an array of stations on said medium with each combination corresponding to a different character and all of said combinations having indicia located at a predetermined number of said stations; comprising, in combination, means for sensing the presence of indicia at each of said stations, a first voltage divider network for establishing a first voltage ratio of known value, a second voltage divider network for establishing a second voltage ratio, means associated with said sensing means for varying the voltage ratio established by said second network in accordance with the number of stations sensed on said medium having indicia located thereat, and comparing means responsive to said first and second voltage ratios for indicating the presence of invalid character-representative signal information.

8. Comparator apparatus for checking the validity of information formed on a record medium and representative of one of diverse characters, said characters being designated by different combinations of indica located at selected ones of an array of stations on said medium with each combination corresponding to a different character and all of said combinations having one of $n$ known quanta of indica, comprising, in combination, means for sensing the presence of indicia at each of said stations, $n$ first voltage divider networks for establishing $n$ first voltage ratios of known value correlated respectively with said $n$ known quanta of indica, a second voltage divider network for establishing a second voltage ratio, means associated with said sensing network for varying the voltage ratio established by said second network in accordance with the number of stations sensed having indica located thereat, and comparing means responsive to each of said $n$ first voltage ratios and to said second voltage ratio for indicating the presence of invalid character-representative information.

9. Comparator apparatus for checking the validity of information formed on a record medium and representative of one of diverse characters, said characters each being designated by different combinations of indicia located at selected one of an array of stations on said medium with each combination corresponding to a different character and all of said combinations having indicia located at a predetermined number of said stations, comprising, in combination, means for sensing the presence of indicia at each of said stations, a Wheatstone bridge, means for varying the resistance of one arm of said bridge in accordance with the quantum of indicia detected by said sensing means, said bridge being balanced only when said sensing means detects the presence of a quantum of indicia correlated with said predetermined number of stations, and balance detector means connected to said bridge.

10. Comparator apparatus for checking the validity of information formed on a record medium and representative of one of diverse characters, said characters being designated by different combinations of indicia located at selected ones of a plurality of alined stations on said medium with each combination corresponding to a different character and all of said combinations having indicia located at a predetermined number of stations, comprising, in combination, means for sensing the presence of indica at each of said stations, a Wheatstone bridge including a first impedance network for establishing a first impedance ratio of known value and a second impedance network for establishing a second impedance ratio, means associated with said sensing means for varying said second impedance ratio in accordance with the number of stations sensed on said medium having indicia located thereat, said second impedance ratio being substantially identical with said first impedance ratio so that said bridge is balanced only when said sensing means detects the presence of indicia at said predetermined number of stations, and means for indicating when said first and second ratios are dissimilar and said bridge is unbalanced.

11. Apparatus for checking the validity of character-representative indicia located at a predetermined number of a plurality of alined stations on a record medium comprising, in combination, means for sensing the presence of indicia at each of said stations, a Wheatstone bridge having four arms, means connected in parallel with one arm of said bridge and associated with said sensing means for varying the resistance of said one arm according to the number of indicia sensed, the remaining three arms of said bridge having values correlated to the resistance of said one arm when indica is sensed at said predetermined number of stations so that the bridge is then balanced, a normally inactive balance detector coupled to said bridge, means for activating said detector when said bridge is unbalanced, and indicating means coupled to said detector.

12. Apparatus for checking the validity of character-representative indicia located at a predetermined number of a plurality of alined stations on a record medium comprising, in combination, means for sensing the presence of indicia at each of said stations, a Wheatstone bridge, a plurality of like resistance elements adapted to be connected in parallel across one arm of said bridge, there being one such element corresponding to each of said stations, means associated with said sensing means for connecting to said arm a first group of said elements and for disconnecting from said arm the remaining group of said elements, one of said groups correlated numerically to the number of stations sensed having indicia located thereat, said bridge being balanced when said one of said groups includes a number of elements corresponding to said predetermined number of stations, and means for producing a signal when said bridge is unbalanced.

13. Apparatus for checking the validity of character-representative indicia located at a predetermined number of an array of stations on a record medium comprising, in combination, means for sensing the presence of indicia at each of said stations, a Wheatstone bridge, a plurality of like resistance elements adapted to be connected in parallel across one arm of said bridge, there being one such element corresponding to each of said stations, means associated with said sensing means for connecting to said arm certain only of said elements, said certain only elements corresponding to stations having no indicia located thereat, said bridge being balanced only when the number of elements disconnected from said arm corresponds numerically to said predetermined number of stations, a balance detector coupled to said bridge, and means for producing a signal when said bridge is unbalanced.

14. Apparatus for checking the validity of character-representative indicia located at one of $n$ known quanta of stations in an array of stations on a record medium comprising, in combination, means for sensing the presence of indicia at each of said stations, a Wheatstone bridge, a plurality of like resistance elements adapted to be connected in parallel across one arm of said bridge, there being one such element corresponding to each of said stations, means for connecting to said arm only those ones of said elements corresponding to stations having no indicia located thereat, said bridge having $n$ balance points respectively corresponding to said $n$ known quanta of stations, said bridge adapted to be balanced only about that one of said $n$ balance points which corresponds to the quantum of stations sensed having indicia located thereat, $n$ balance detectors respectively coupled to said $n$ balance point, and means for indicating when said bridge bridge is unbalanced about all of said $n$ points.

15. Apparatus for checking the validity of information formed on a record medium and representative of one of diverse characters, said characters being designated by different combinations of indicia located at a plurality of alined stations on said medium with each combination corresponding to a different character and all of said combinations having indicia located at one of $n$ predetermined numbers of said stations, said apparatus comprising, in combination, means for sensing the presence of indicia at each of said stations, a Wheatstone bridge, said bridge having two arms defining $n$ balance points respectively corrsponding to said $n$ predetermined numbers of stations, menas associated with said sensing means for varying the resistance of a third arm of said bridge in accordance with the number of stations sensed having indicia present thereat so as to balance said bridge about that one of said $n$ points corresponding thereto, $n$ balance detectors each coupled to a different one of said $n$ balance points and all coupled to said third arm for indicating when said bridge is balanced about the corresponding ones of said $n$ points, each of said detectors including means for producing an output signal when said bridge is unbalanced about the corresponding balance point, and means activated by all of said detectors for producing a signal only when said bridge is unbalanced about all of said $n$ points.

16. Apparatus for checking the validity of information formed on a record medium and representative of one of diverse characters, said characters being designated by different combinations of indicia located at a plurality of alined stations on said medium with each combination corresponding to a different character and all of said combinations having indicia located at a predetermined number of said stations, comprising, in combination, means for sensing the presence of indicia at each of said stations, bridge circuit means, means associated with said bridge circuit means for balancing the latter when said sensing means detects the presence of indicia at said predetermined number of stations in each combination and for unbalancing said bridge circuit means when the presence of indicia at other than said predetermined number of stations in any combination is sensed, and means for indicating when said bridge circuit means is unbalanced.

17. Apparatus for checking the validity of information formed on a record medium and representative of one of diverse characters, said characters being designated by different combinations of indicia located at selected ones of an array of stations on said medium with each combination corresponding to a different character and all of said combinations having one of $n$ known quanta of indicia, comprising, in combination, means for sensing the presence of indicia at each of said stations, multiple bridge circuit means having $n$ balance points, means associated with said sensing means and said multiple bridge circuit means for balancing the latter about one of said $n$ balance points when said sensing means detects the presence of a quantum of indicia corresponding to one of said $n$ known quanta and for unbalancing said multiple bridge circuit means about all other of said $n$ balance points, and means for indicating when said multiple bridge circuit means is unbalanced about all of said $n$ balance points.

18. Apparatus for checking the validity of information formed on a record medium and representative of $x$ diverse characters, said characters being designated by different combinations of indicia spots located at $x$ adjacent arrays on said medium with each combination corresponding to a different character and all of said combinations having a known quantum of indicia spots, comprising, in combination, means for sensing the presence of indicia spots at each of said stations, $x$ bridge circuit means respectively corresponding to said $x$ arrays and all having at least two common arms, means associated with said sensing means and with each of said $x$ bridge circuit means for balancing respective ones of the latter when said sensing means detects the presence of a quantum of indicia spots corresponding to said known quantum in the associated array and for unbalancing that bridge circuit means when the quantum of indicia spots sensed differs from said known quantum, and means for indicating when at least one of said $x$ bridge circuit means is unbalanced.

19. Apparatus for checking the validity of information formed on a record medium and representative of $x$ diverse characters, said characters being designated by different combinations of indicia located at $x$ adjacent arrays on said medium with each combination corresponding to a different character and all of said combinations having one of $n$ known quanta of indicia, comprising, in combination, means for sensing the presence of indicia at each of said stations, $x$ multiple bridge circuit means respectively associated with said $x$ arrays with each of said multiple bridge circuit means having $n$ common balance points, means associated with each of said $x$ multiple bridge circuit means for balancing the latter about one of said $n$ common balance points when said sensing means detects the presence of a quantum of indicia in the associated array corresponding to one of said $n$ known quanta and for unbalancing said bridge circuit means about all other of said $n$ balance points, and means for indicating when at least one of said $x$ multiple bridge circuit means is unbalanced about all of its associated $n$ balance points.

20. Comparator apparatus for verifying the validity of signal information sensed from a record medium having character-representative indicia spots formed thereon in $x$ adjacent arrays with each of said $x$ arrays representative of one character and with all valid characters being represented by one of $n$ known quanta of spots, comprising, in combination, means for sensing the presence of all of said indicia spots formed on said medium to represent $x$ characters, means associated with said sensing means for converting the signal information sensed from said $x$ arrays to $x$ first electrical values respectively correlated to the quanta of indicia spots sensed in said $x$ arrays, means establishing $n$ second electrical values respectively correlated with the $n$ known quanta of indicia spots representative of valid characters, and means for comparing each of said $x$ first electrical values with each of said $n$ second electrical values to indicate when the signal information sensed is representative of at least one invalid character.

21. Comparator apparatus for verifying the validity of signal information sensed from a record medium having character-representative indicia spots formed thereon in $x$ adjacent arrays with each of said $x$ arrays representative of one character and with all valid characters being represented by one of $n$ known quanta of spots, comprising, in combination, means for sensing the presence of all of said indicia spots formed on said medium to represent $x$ characters, $x$ first impedance networks respectively corresponding to said $x$ arrays, means associated with said sensing means for varying the impedance values of each of said $x$ first networks in accordance with the quantum of indicia spots sensed in each of said $x$ arrays respectively, $n$ second impedance networks for establishing $n$ second impedance values respectively correlated with the $n$ known quanta of indicia spots representative of all valid characters, and comparing means responsive to the impedance value of each of said $x$ first impedance networks and to each of said $n$ second impedance values for indicating when the signal information sensed is representative of at least one invalid character.

22. Comparator apparatus for checking the validity of information formed on a record medium in $x$ adjacent arrays respectively representative of selected one of diverse characters, said characters being designated by different combinations of indicia located at selected ones of a plurality of station in each of said $x$ arrays on said medium with each combination corresponding to a different character and all of said combinations having one of $n$ known quanta of indicia, comprising, in combination, means for sensing the presence of indicia at each of said stations in all of said $x$ arrays, $n$ first resistance networks for establishing $n$ known electrical values respectively correlated with said $n$ known quanta of indicia, $x$ second resistance networks respectively corresponding to said $x$ arrays, $x$ sets of like resistances adapted to be connected in parallel with said $x$ second networks respectively, means associated with said sensing means for connecting certain only of said like resistances in each set thereof in parallel with the corresponding one of said $x$ second networks to establish $x$ second electrical values, the quantum of said certain only like resistances in each set thereof being correlated with the quantum of indicia sensed in the corresponding one of said $x$ arrays, and comparing means responsive to each of said $n$ known values and to each of said $x$ second values for indicating the presence of information representative of at least one invalid character.

23. Comparator apparatus for checking the validity of information formed on a record medium in $x$ adjacent arrays respectively representative of selected ones of diverse characters, said characters being designated by different combinations of indicia located at selected ones of a plurality of station in each of said $x$ arrays on said medium with each combination corresponding to a different character and all of said combinations having one of $n$ known quanta of indicia, comprising, in combination, means for sensing the presence of indicia at each of said stations in all of said $x$ arrays, $n$ first voltage divider networks for establishing $n$ first voltage ratios of known value correlated respectively with said $n$ known quanta of indicia, $x$ second voltage divider networks respectively corersponding to said $x$ arrays for establishing $x$ second voltage ratios, means associated with said sensing means for independently varying said $x$ second voltage ratios established by said $x$ second networks in accordance with the number of stations sensed having indicia located thereat in corresponding ones of said $x$ arrays, and comparing means responsive to each of said $n$ first voltage ratios and to each of said $x$ second voltage ratios for indicating the presence of at least one invalid character-representative information.

24. Apparatus for checking the validity of character-representative indicia located at one of $n$ known quanta of stations in each of $x$ adjacent arrays of sations on a record medium with each array being representative of a particular character, comprising, in combination, means for sensing the presence of indicia at each of said stations in all of said $x$ arrays, $x$ Wheatstone bridge circuits respectively corresponding to said $x$ arrays and all having at least two common arms, $x$ sets of like resistance elements adapted to be connected in parallel across respective ones of $x$ third arms of said $x$ bridge circuits respectively for establishing $x$ first electrical values, there being one such element in each set thereof corresponding to each station in the associated one of said $x$ arrays, means for connecting to each of said $x$ third arms only those one of said elements corresponding to stations having no indicia located thereat in corresponding ones of said $x$ arrays, said two common arms having $n$ balance points defining $n$ reference electrical values respectively corresponding to said $n$ known quanta of stations, each of said $x$ bridge circuits adapted to be balanced about only that one of said $n$ balance points which corresponds to the quantum of stations sensed having indicia located thereat in a corresponding one of said $x$ arrays, and comparing means responsive to each of said $x$ first electrical values and to each of said $n$ reference electrical values for indicating the presence of at least one invalid character-representative array.

25. Apparatus for checking the validity of information formed on a record medium and representative of one of diverse characters, said characters being designated by different combinations of indicia located at a plurality of alined stations on said medium with each combination corresponding to a different character, certain of said combinations having indicia located at a first predetermined number of said stations and the remainder of said combinations having indicia located at a second predetermined number of stations, said apparatus comprising, in combination, means for sensing the presence of indicia at each of said stations, bridge circuit means having first and second balance points respectively corresponding to said first and second predetermined number of stations, first and second balance detectors respectively coupled to said bridge circuit means at said first and second balance points, means associated with said sensing means and said bridge circuit means for varying the resistance of one arm of the latter in accordance with the number of stations sensed having indicia present thereat, said first balance detector being inactive when the presence of indicia is sensed at said first predetermined number of stations and active when indicia is sensed at any other number of stations, said second balance detector being inactive when the presence of indicia is sensed at said second predetermined number of stations and active when indicia is sensed at any other number of stations, and means for indicating when both of said balance detectors are activated.

26. Apparatus for checking the validity of information formed on a record medium and representative of one of diverse characters, said characters being designated by different combinations of indicia located at a plurality of alined stations on said medium with each combination corresponding to a different character, certain of said combinations having indicia located at a first predetermined number of stations and the remainder of said combinations having indicia located at a second predetermined number of said stations, said apparatus comprising, in combination, means for sensing the presence of indicia at each of said stations, bridge circuit means having first and second balance points respectively corresponding to said first and second predetermined number of stations, first and second balance detectors respectively coupled to said bridge circuit means at said first and second balance points, means associated with said sensing means and said bridge circuit means for varying the resistance of one arm of the latter in accordance with the number of stations sensed having indicia present thereat, said first balance detector being inactive when the presence of indicia is sensed at said first predetermined number of stations and active when indicia is sensed at any other number of stations, said second balance detector being inactive when the presence of indicia is sensed at said second predetermined number of stations and active when indicia is sensed at any other number of stations, a first set of normally open contacts and means for closing said contacts when said first detector is activated, a second set of normally open contacts and means for closing said contacts when said second detector is activated, a voltage source, and an indicating device, said first and second sets of contacts being connected in series with said voltage source and said indicating device.

27. In apparatus for acting upon a document having diverse bits of information applied thereto, each of said bits of information being designated by a different combination of indicia spots located at selected ones of an array of stations on said documents with all of said different valid combinations including *n* indicia spots, the combination comprising, a utilization device, a sensing head, a plurality of sensing elements carried by said head for detecting the presence of an indicia spot at each of said stations, said elements disposed in an array corresponding to said array of stations, support means on said head for receiving and alining said document, said support means being movable relative to said sensing elements so that the array of stations on said document may be brought into registration with the array of sensing elements, means interconnecting said sensing elements and said utilization device for transmitting the information sensed to the latter, means associated with said sensing elements for detecting the number of indicia spots sensed in said array of stations, means for comparing the number of indicia spots detected with the known number *n* of indicia spots representative of a valid character, and means for inhibiting operation of said utilization device when other than the presence of *n* indicia spots are sensed in said array.

28. In apparatus for acting upon a document having diverse bits of information applied thereto, each of said bits of information being designated by a different combination of perforations located at selected ones of an array of stations on said document with all of said different combinations including one of *n* quanta of perforations, the combination comprising, a utilization device, a sensing head, a plurality of sensing elements carried by said head for detecting the presence of a perforation at each of said stations, said elements disposed in an array corresponding to said array of stations, support means on said head for receiving and aligning said document, said support means being movable relative to said sensing elements so that the array of stations on said documents may be brought into registration with the array of sensing elements, means interconnecting said sensing elements and said utilization device for transmitting the information sensed to the latter, means associated with said sensing elements for detecting the number of perforations sensed in said array of stations, means for comparing the number of perforations detected with each of said *n* quanta of perforations, and means for inhibiting operation of said utilization device when other than the presence of one of said *n* quanta of perforations are sensed in said array.

29. In apparatus for acting upon a document having diverse bits of information applied thereto, each of said bits of information being designated by a different combination of indicia spots located at selected ones of an array of stations on said document with all of said different combinations having one of *n* quanta of indicia spots, the combination comprising, a utilization device, a sensing head, a plurality of sensing elements carried by said head for detecting the presence of an indicia spot at each of said stations, said elements disposed in arrays corresponding to said arrays of stations, support means on said head for receiving and alining said document, said support means being movable relative to said sensing elements so that the arrays of stations on said document may be brought into registration with the corresponding arrays of sensing elements, means interconnecting said sensing elements and said utilization device for transmitting the information sensed to the latter, means associated with said sensing elements for detecting the number of indicia spots sensed in each array of stations, means for comparing the number of indicia spots detected with each of said *n* quanta of indicia spots, and means for inhibiting operation of said utilization device when the number of indicia spots sensed in any of said arrays is dissimilar to all of said *n* quanta of indicia spots.

30. In apparatus for acting upon a document having *x* diverse bits of information applied thereto, each of said *x* bits of information being designated by a different combination of indicia spots located at selected ones of an array of stations on said document with all of said different combinations having one of *n* quanta of indicia spots, the combination comprising, a utilization device, a sensing head, a plurality of sensing elements carried by said head for detecting the presence of an indicia spot at each of said stations, said elements disposed in *x* arrays respectively corresponding to the arrays of stations associated with said *x* bits of information, support means on said head for receiving and alining said document, said support means being movable relative to said sensing elements so that the arrays of stations on said document may be brought into registration with the arrays of sensing elements, means interconnecting said sensing elements and said utilization device for transmitting the information sensed to the latter, means associated with said sensing elements for detecting the number of perforations sensed in each of said arrays of stations, means for comparing the number of perforations detected in each of said arrays of stations with each of said $n$ quanta of indicia spots, and means for inhibiting operation of said utilization device when other than the presence of one of said $n$ quanta of indicia spots are sensed in at least one of said $x$ arrays.

References Cited by the Examiner

UNITED STATES PATENTS

| | | | |
|---|---|---|---|
| 2,611,538 | 9/1952 | Hatton | 235—179 |
| 2,708,368 | 5/1955 | Kolisch | 235—179 |
| 3,049,286 | 8/1962 | Dreyer et al. | 234—85 |

MALCOLM A. MORRISON, *Primary Examiner.*